United States Patent
Chen et al.

(10) Patent No.: US 11,526,038 B2
(45) Date of Patent: Dec. 13, 2022

(54) DISPLAY DEVICE, VIEWING ANGLE LIMITING DEVICE AND MANUFACTURING METHOD THEREOF

(71) Applicant: Coretronic Corporation, Hsin-Chu (TW)

(72) Inventors: Ping-Yen Chen, Hsin-Chu (TW); Wen-Chun Wang, Hsin-Chu (TW); Chung-Yang Fang, Hsin-Chu (TW); Yang-Ching Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/243,471

(22) Filed: Apr. 28, 2021

(65) Prior Publication Data

US 2021/0349335 A1 Nov. 11, 2021

Related U.S. Application Data

(60) Provisional application No. 63/021,083, filed on May 6, 2020.

(30) Foreign Application Priority Data

Jul. 15, 2020 (CN) .......................... 202010679643.9

(51) Int. Cl.
*G02F 1/13* (2006.01)
*G02F 1/1335* (2006.01)
*G02F 1/1337* (2006.01)

(52) U.S. Cl.
CPC .......... *G02F 1/1323* (2013.01); *G02F 1/1337* (2013.01); *G02F 1/133528* (2013.01)

(58) Field of Classification Search
None
See application file for complete search history.

(56) References Cited

U.S. PATENT DOCUMENTS

2001/0038369 A1* 11/2001 Adachi .................... G09G 3/36
345/87
2016/0195660 A1* 7/2016 Nakao ................... B29C 48/154
427/164

(Continued)

FOREIGN PATENT DOCUMENTS

CN 107144990 9/2017
CN 108957893 A * 12/2018 ........... G02F 1/1333

(Continued)

*Primary Examiner* — Phu Vu
(74) *Attorney, Agent, or Firm* — JCIPRNET

(57) ABSTRACT

A viewing angle limiting device, including a polymer substrate and a plurality of dye molecules, is provided. The dye molecules are dispersedly arranged in the polymer substrate. The dye molecules have a first absorption coefficient in a thickness direction of the polymer substrate. The dye molecules have a second absorption coefficient in a direction perpendicular to the thickness direction. A ratio of the first absorption coefficient to the second absorption coefficient is between 10 and 1000. A manufacturing method of the viewing angle limiting device and a display device including the viewing angle limiting device are also provided. The display device, the viewing angle limiting device, and the manufacturing method thereof provided by the invention have a large viewing angle filtering effect and have higher light transmittance in a viewing angle direction.

26 Claims, 42 Drawing Sheets

(56) References Cited

U.S. PATENT DOCUMENTS

2018/0210243 A1* 7/2018 Fang ................ G02F 1/133528
2020/0326567 A1* 10/2020 Fang ................ G02F 1/133528

FOREIGN PATENT DOCUMENTS

| CN | 110133882 | 8/2019 | | |
|---|---|---|---|---|
| DE | 102019003383 A1 | * | 11/2019 | ........... G02F 1/1323 |
| WO | WO-2015012223 A1 | * | 1/2015 | ........... G02B 5/3083 |

* cited by examiner

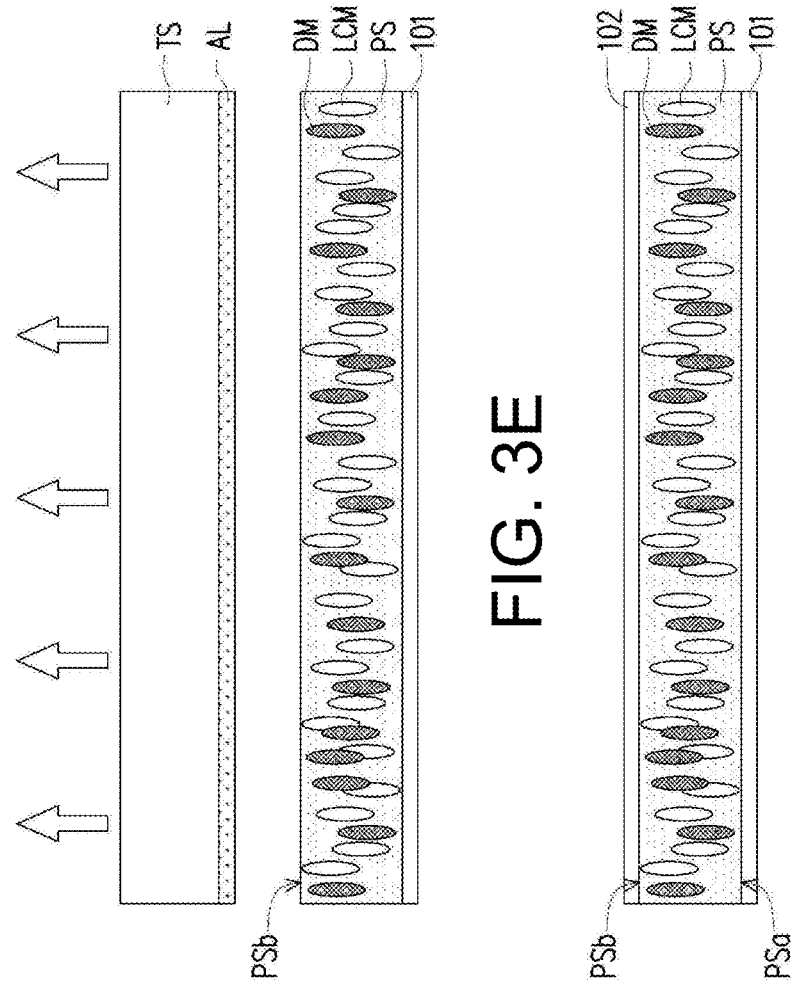

DISPLAY DEVICE, VIEWING ANGLE LIMITING DEVICE AND MANUFACTURING METHOD THEREOF

CROSS-REFERENCE TO RELATED APPLICATION

This application claims the priority benefit of U.S. provisional application Ser. No. 63/021,083, filed on May 6, 2020 and China application serial no. 202010679643.9, filed on Jul. 15, 2020. The entirety of the above-mentioned patent application is hereby incorporated by reference herein and made a part of this specification.

BACKGROUND

Technical Field

The invention relates to an anti-peep technology, and particularly relates to a display device, a viewing angle limiting device and a manufacturing method thereof.

Description of Related Art

Generally, a display device usually has a wide viewing angle display effect in order to facilitate multiple viewers to view together. However, in some situations or occasions, for example, when a user browses a private web page or confidential information or input a password in public, the wide viewing angle display effect is easy to cause a screen image to be peeped by others, thereby causing leakage of the confidential information. In order to achieve an anti-peep effect, a general method is to place a light control film (LCF) in front of a display panel to filter large-angle light beams. Conversely, when the anti-peep effect is not in need, the LCF is manually moved away from the front of the display panel. In other words, although this kind of LCF has the anti-peep effect, there is still a room for improvement in operation convenience thereof. Therefore, how to develop a display device with extremely convenient viewing angle switching effect and excellent anti-peep effect has become an important issue for related manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a viewing angle limiting device, which has a large viewing angle filtering effect and has a high light transmittance in a viewing angle direction.

The invention provides a manufacturing method of a viewing angle limiting device, which increases flexibility of an optical design thereof and a manufacturing process margin.

The invention provides a display device with anti-peep performance, which has higher light transmittance in a sharing mode.

In order to achieve one, a portion of, or all of the objectives or other objectives, an embodiment of the invention provides a viewing angle limiting device. The viewing angle limiting device includes a polymer substrate and a plurality of dye molecules. The dye molecules are dispersedly arranged in the polymer substrate. The dye molecules have a first absorption coefficient in a thickness direction of the polymer substrate. The dye molecules have a second absorption coefficient in a direction perpendicular to the thickness direction, and a ratio of the first absorption coefficient to the second absorption coefficient is between 10 and 1000.

In order to achieve one, a portion of, or all of the objectives or other objectives, an embodiment of the invention provides a manufacturing method of a viewing angle limiting device. The manufacturing method of the viewing angle limiting device includes the following steps. A liquid crystal mixed material layer is formed on a temporary substrate and the liquid crystal mixed material layer is cured to cause a polymerization reaction of a plurality of reactive monomers to form a polymer substrate. The liquid crystal mixed material layer includes a plurality of liquid crystal molecules, a plurality of dye molecules, and the reactive monomers, and the dye molecules are arranged corresponding to optical axes of the liquid crystal molecules. The dye molecules have a first absorption coefficient in a direction perpendicular to a surface of the temporary substrate. The dye molecules have a second absorption coefficient in a direction parallel to the surface of the temporary substrate, and a ratio of the first absorption coefficient to the second absorption coefficient is between 10 and 1000. The liquid crystal molecules and the dye molecules are dispersedly arranged in the polymer substrate.

In order to achieve one, a portion of, or all of the objectives or other objectives, an embodiment of the invention provides a display device. The display device includes a polarizer, at least one viewing angle limiting device, an electronically controlled viewing angle switch and a display panel. The viewing angle limiting device is overlapped with the polarizer, and includes a polymer substrate and a plurality of dye molecules. The dye molecules are dispersedly arranged in the polymer substrate. The dye molecules have a first absorption coefficient in a thickness direction of the polymer substrate. The dye molecules have a second absorption coefficient in a direction perpendicular to the thickness direction, and a ratio of the first absorption coefficient to the second absorption coefficient is between 10 and 1000. The electronically controlled viewing angle switch is arranged between the polarizer and the at least one viewing angle limiting device. The display panel is overlapped with the at least one viewing angle limiting device.

Based on the above descriptions, in the viewing angle limiting device and the display device of an embodiment of the invention, by configuring the first absorption coefficient of the dye molecules in the thickness direction of the polymer substrate to be significantly greater than the second absorption coefficient of the dye molecules in the direction perpendicular to the thickness direction, a filtering effect of the viewing angle limiting device in a side viewing angle and a light transmittance of the viewing angle limiting device in a viewing angle direction may be effectively increased, so as to improve the anti-peep performance of the display device and an overall brightness of light beams of other viewing angles after exiting the display device. On the other hand, in the manufacturing method of the viewing angle limiting device according to an embodiment of the invention, in order to make the absorption coefficient of the dye molecules in the direction parallel to the predetermined direction to be significantly different from the absorption coefficient of the dye molecules in the direction perpendicular to the predetermined direction, a plurality of liquid crystal molecules arranged in the predetermined direction are used to drive the dye molecules to form an ordered arrangement and distribution, which increases optical design flexibility of the viewing angle limiting device and a manufacturing process margin.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3A to FIG. 3F are schematic cross-sectional views of a manufacturing process of a viewing angle limiting device of FIG. 1.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
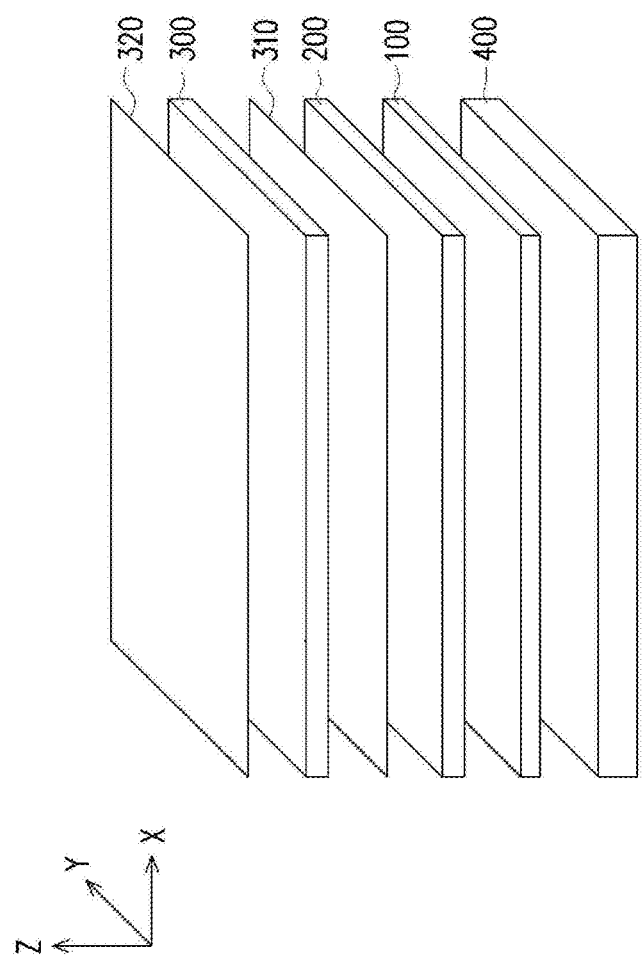
FIG. 1 is a schematic diagram of a display device according to a first embodiment of the invention.
Figure 4:
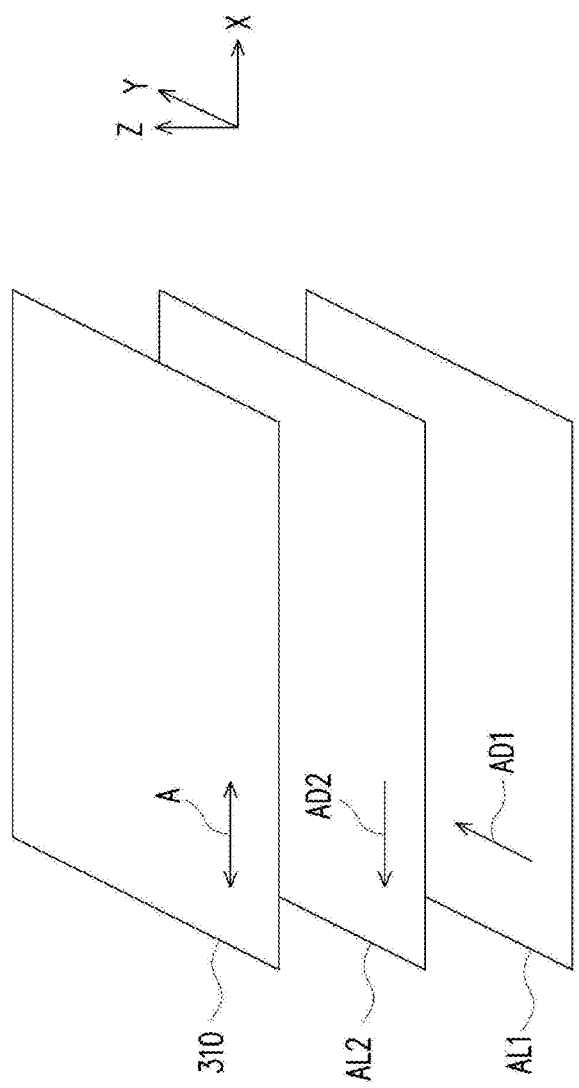
FIG. 4 is a schematic diagram of a part of film layers of the display device of FIG. 1.
Figures 5A, 5B:
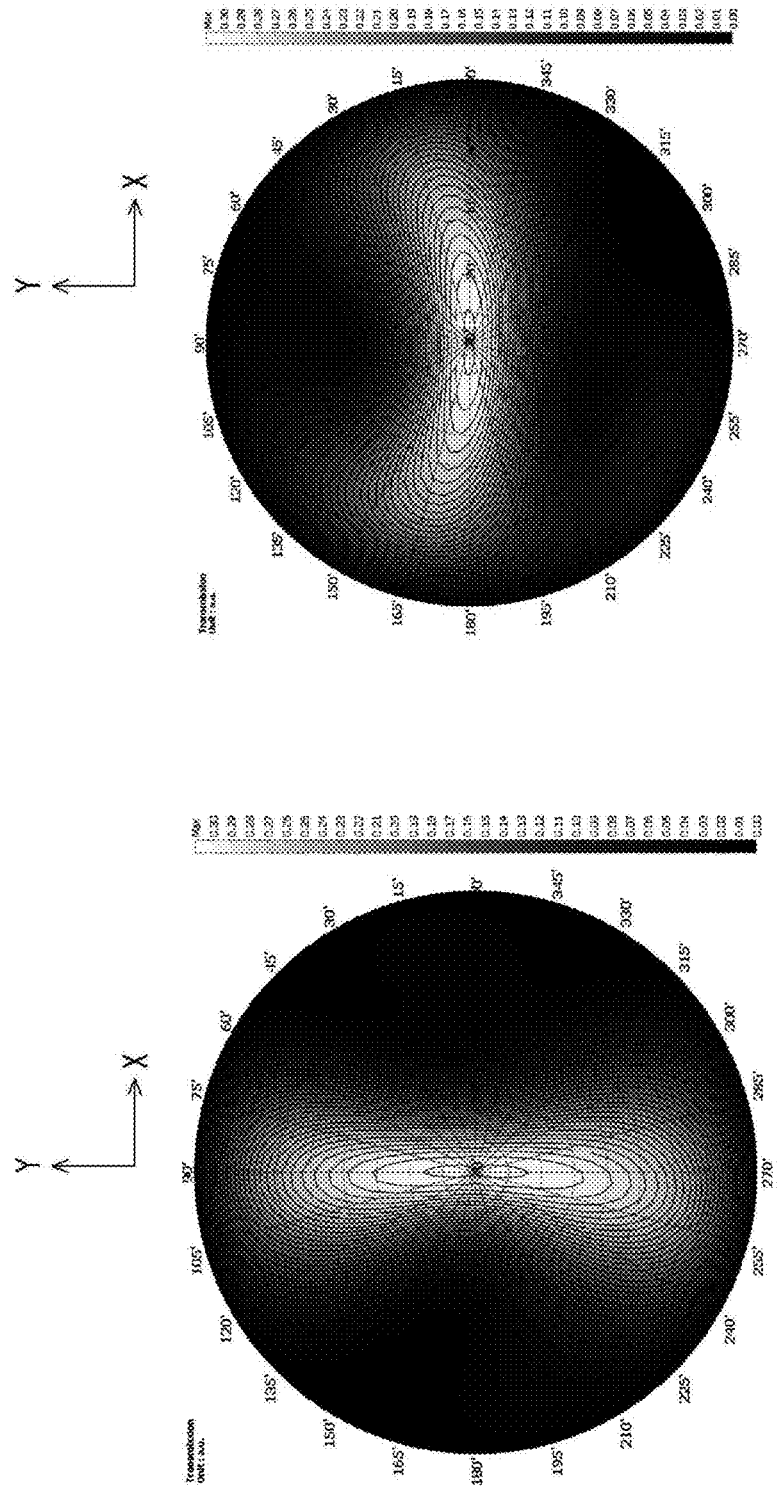
FIG. 5A and FIG. 5B are transmittance distribution diagrams of the display device of FIG. 1 operated in different anti-peep modes.

FIG. 1 is a schematic diagram of a display device according to a first embodiment of the invention. FIG. 2A to FIG. 2D are schematic cross-sectional views of the display device of FIG. 1 in different planes when operating in different anti-peep modes. FIG. 3A to FIG. 3F are schematic cross-sectional views of a manufacturing process of a viewing angle limiting device of FIG. 1. FIG. 4 is a schematic diagram of a part of film layers of the display device of FIG. 1. FIG. 5A and FIG. 5B are transmittance distribution diagrams of the display device of FIG. 1 operated in different anti-peep modes. In particular, for clarity's sake, FIG. 2A to FIG. 2D omit illustration of a display panel 300 and a polarizer 320 of FIG. 1.

Referring to FIG. 1, FIG. 2A to FIG. 2D, the display device 10 includes a viewing angle limiting device 100, an electrically controlled viewing angle switch 200, a display panel 300, a polarizer 310 and a polarizer 320 arranged in overlap with each other. The electronically controlled viewing angle switch 200 is disposed between the polarizer 310 (or the polarizer 320) and the viewing angle limiting device 100. The display panel 300 is disposed on one side of the polarizer 310 away from the electronically controlled viewing angle switch 200 and the viewing angle limiting device 100. In the embodiment, the display panel 300 is a non-self-luminous display panel, such as a liquid crystal display panel, but the invention is not limited thereto. For example, the display panel 300 may include a liquid crystal layer (not shown) and two electrode layers (not shown), and the liquid crystal layer is disposed between the two electrode layers. When the display panel 300 is enabled, a voltage is applied between the two electrode layers to form an electric field, and the electric field may drive a plurality of liquid crystal molecules in the liquid crystal layer to rotate to form an optical axis arrangement corresponding to a magnitude of the electric field. At this time, the optical axis arrangement of the liquid crystal layer is used to modulate a polarization state of an incident light beam, so that the incident light beam has a corresponding light intensity after passing through the polarizer to achieve an effect of grayscale display. In particular, the display panel 300 in the embodiment does not include a polarizer.

It should be noted that since the display panel 300 is a non-self-luminous display panel, the display device 10 may also selectively include a backlight module 400. The backlight module 400 is overlapped with the display panel 300, the viewing angle limiting device 100 and the electronically controlled viewing angle switch 200. For example, the backlight module 400 may be a general backlight module with a plurality of brightness enhancement films (such as 3M BEFs, not shown) and diffusion films (not shown), or a concentrating backlight module using a reverse prism sheet (such as DNP W528, not shown). In the embodiment, the viewing angle limiting device 100 and the electronically controlled viewing angle switch 200 may be disposed between the display panel 300 and the backlight module 400, but the invention is not limited thereto. In other embodiments, the display panel 300 may also be located between the electronically controlled viewing angle switch 200 (or the viewing angle limiting device 100) and the backlight module 400.

Figure 2A:
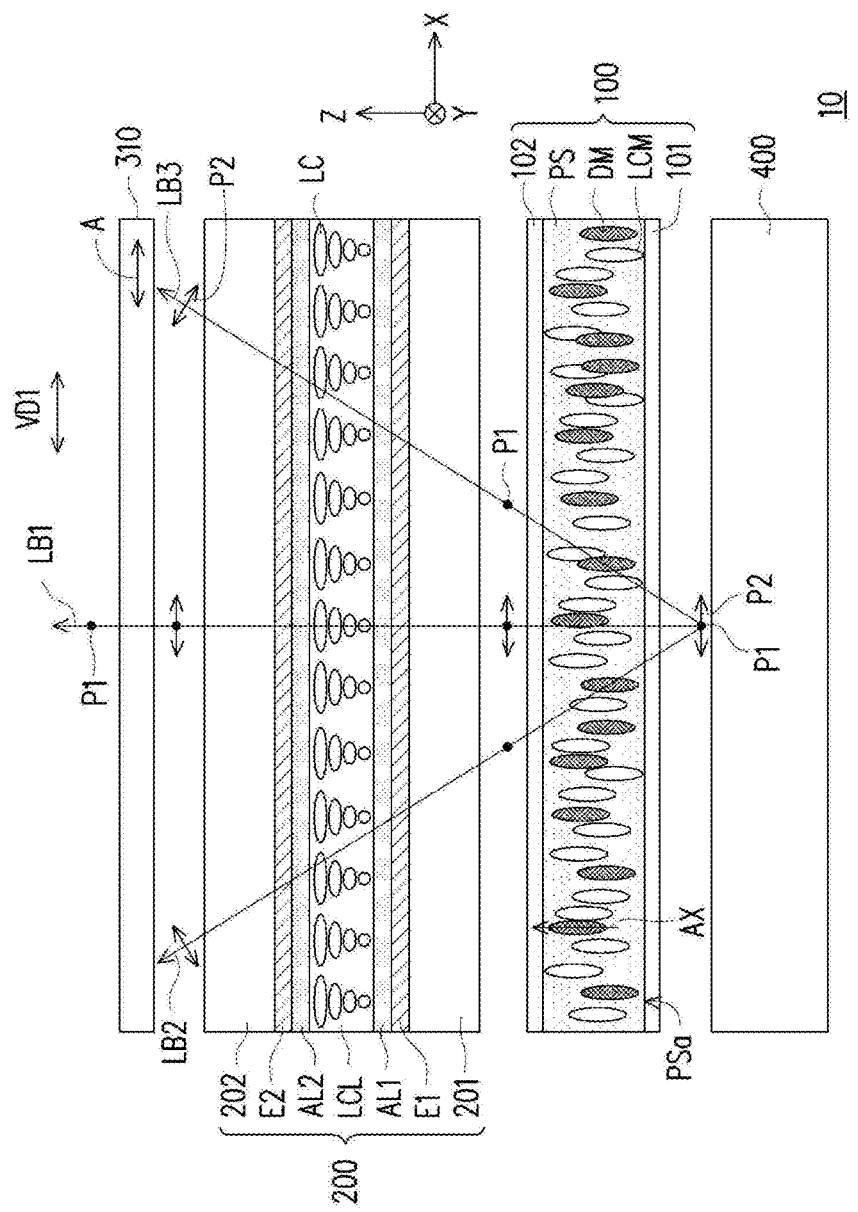
FIG. 2A to FIG. 2D are schematic cross-sectional views of the display device of FIG. 1 in different planes when operating in different anti-peep modes.

Further, referring to FIG. 2A, the viewing angle limiting device 100 includes a polymer substrate PS and a plurality of dye molecules DM. The dye molecules DM are dispersedly arranged in the polymer substrate PS. In the embodiment, the polymer substrate PS has a substrate surface PSa, and an axial direction of absorption axes AX of the dye molecules DM may be perpendicular to the substrate surface PSa of the polymer substrate PS, i.e., the axial direction of the absorption axes AX of the dye molecules DM may be parallel to a thickness direction of the polymer substrate PS. Particularly, the dye molecules DM have a first absorption coefficient in the thickness direction (i.e., a direction perpendicular to the substrate surface PSa, such as a direction Z), and have a second absorption coefficient in a direction perpendicular to the thickness direction (for example, a direction X or a direction Y), and the first absorption coefficient is different from the second absorption coefficient. It should be noted that the aforementioned thickness direction may be a normal direction of the substrate surface PSa, and the substrate surface PSa of the polymer substrate PS is, for example, overlapped with the backlight module 400 in the thickness direction.

In the embodiment, the first absorption coefficient of the dye molecules DM is significantly greater than the second absorption coefficient. To be specific, the greater a value of the first absorption coefficient is, the better an anti-peep effect is, and the smaller a value of the second absorption coefficient is, the higher a transmittance in a direction parallel to the thickness direction is, so that a ratio of the first absorption coefficient to the second absorption coefficient is ideally at least greater than 1, and the larger the ratio is, the better the anti-peep effect and a display effect are. Considering a functional benefit, the ratio of the first absorption coefficient to the second absorption coefficient may be between 10 and 1000. In this way, a filtering effect of the viewing angle limiting device 100 in a side viewing angle and a light transmittance thereof in a viewing angle range may be effectively enhanced, thereby improving the anti-peep performance of the display device 10 and an overall brightness of light beams of other viewing angles after exiting the display device 10. In the embodiment, the ratio of the first absorption coefficient to the second absorption coefficient of the dye molecules DM may be between 100 and 1000. In an exemplary embodiment, the ratio of the first absorption coefficient to the second absorption coefficient of the dye molecules DM may also be between 500 and 1000. In particular, if an anti-peep range of the viewing angle limiting device 100 of the invention needs to be increased, multiple layers of the viewing angle limiting devices may be stacked to improve the anti-peep effect, for example, two pieces of the viewing angle limiting devices 100 may be used to increase the anti-peep range, and a compensation film may be added between the two pieces of the viewing angle limiting devices 100. For example, the viewing angle limiting device 100 may include at least one another polymer substrate (not shown), and the dye molecules DM are not only dispersedly arranged in the polymer substrate PS, but also dispersedly arranged in the at least one another polymer substrate, i.e., the polymer substrate PS and the at least one another polymer substrate both have the dye molecules DM inside, and the compensation film is located between the polymer substrate PS and the at least one another polymer substrate, but the invention is not limited thereto. In other embodiment, another viewing angle limiting device 100 may be further provided on the viewing angle limiting device 100 in the display device 10 of FIG. 1, and a compensation film, such as an A-plate compensation film, may be provided between the two viewing angle limiting devices 100, where an in-plane retardation thereof is a half wavelength or an odd multiple of the half wavelength. An optical axis of the compensation film may be parallel or perpendicular to a viewing angle control direction. At this time, after an oblique light beam including an angle of 45 degrees with the direction Y passes through the viewing angle limiting device 100, a polarization state thereof is changed due to the compensation film, and then the oblique light beam is absorbed by another viewing angle limiting device 100. In this way, light beams with azimuth angles near 45 degrees, 135 degrees, 225 degrees, and 315 degrees may all have the anti-peep effect. It should be noted that when the in-plane retardation of the A-plate compensation film is greater or less than the odd multiple of the half wavelength, the anti-peep effect for the light beams with azimuth angles near 45 degrees, 135 degrees, 225 degrees, and 315 degrees may be reduced. If both anti-peep and sharing modes are taken into consideration, a value ranging from a one-tenth of wavelength to nine-tenths of wavelength may be selected. For example, the in-plane retardation of the A plate compensation film may be 220 nm or 140 nm, but not the invention is not limited thereto. In addition, the display device of the invention may not include the electronically controlled viewing angle switch 200, and still has the anti-peep effect, but does not have a switching function. A manufacturing process of the viewing angle limiting device 100 is exemplarily described below.

Figure 3A:
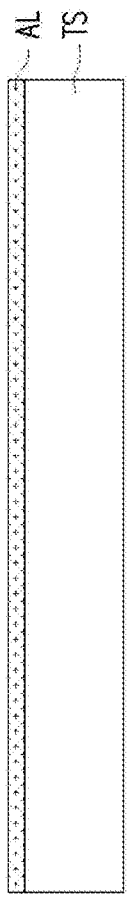
Figure 3B:
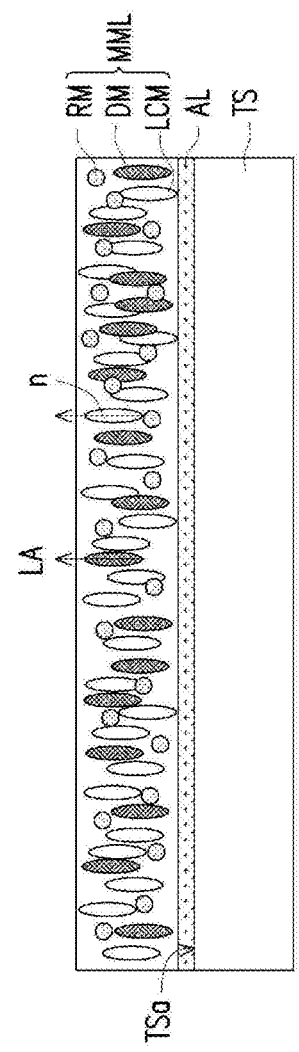

Referring to FIG. 3A and FIG. 3B, first, a temporary substrate TS (as shown in FIG. 3A) is provided, and a liquid crystal mixed material layer MML is formed on the temporary substrate TS (as shown in FIG. 3B). Furthermore, the liquid crystal mixed material layer MML includes a plurality of liquid crystal molecules LCM, a plurality of dye molecules DM, and a plurality of reactive monomers RM. The dye molecules DM are arranged corresponding to optical axes n of the liquid crystal molecules LCM. For example, in the embodiment, before the liquid crystal mixed material layer MML is formed, the manufacturing method of the viewing angle limiting device 100 may selectively include forming an alignment film AL on the temporary substrate TS (as shown in FIG. 3A) so that an axial direction of the optical axes n of the liquid crystal molecules LCM may be perpendicular to the surface TSa of the temporary substrate TS. A material of the alignment film AL includes long-carbon alkanol materials, siloxane materials or polyimide. However, the invention is not limited thereto, and in other embodiments, the liquid crystal mixed material layer MML may further include an alignment additive to achieve self-alignment of the liquid crystal molecules LCM in a direction perpendicular to the surface TSa of the temporary substrate TS. Namely, in the embodiment, the alignment film AL may not be provided on the surface TSa of the temporary substrate TS.

Based on the above description, the dye molecules DM dispersed among the liquid crystal molecules LCM are affected by the liquid crystal molecules LCM under, for example, a guest-host effect, and a molecular long axis LA thereof tends to be parallel to the optical axes n of the liquid crystal molecules LCM. In the embodiment, an absorption coefficient of the dye molecules DM in an axial direction of the molecular long axis LA is greater than an absorption coefficient of the dye molecules DM in a direction perpendicular to the molecular long axis LA. To be specific, the dye molecules DM have an absorption axis AX (as shown in FIG. 2A) in the axial direction of the molecular long axis LA. Therefore, when the dye molecules DM are arranged in parallel to the optical axes n of the liquid crystal molecules LCM, the first absorption coefficient of the dye molecules DM in the direction perpendicular to the surface TSa of the temporary substrate TS may be greater than the second absorption coefficient of the dye molecules DM in the direction parallel to the surface TSa of the temporary substrate TS.

It should be noted that in order to make the absorption coefficient of the dye molecules DM in a direction parallel to a predetermined direction to be obviously different from the absorption coefficient of the dye molecules DM in the direction perpendicular to the predetermined direction, a plurality of the liquid crystal molecules LCM arranged in the predetermined direction are used to drive the dye molecules DM to form a directional arrangement and distribution, which may increase optical design flexibility and a manufacturing process margin of the viewing angle limiting device 100.

In the embodiment, a material of the dye molecules DM may include an Azo type compound or an anthraquinone type compound. A material of the liquid crystal molecules LCM may include a nematic liquid crystal material, a smectic liquid crystal material or a discotic liquid crystal material. However, the invention is not limited thereto. According to other embodiments, the liquid crystal molecules may also be materials with chemical functional groups similar to a dichroic dye structure. Namely, in the embodiment, the liquid crystal mixed material layer MML may not have the aforementioned dye molecules DM.

Figure 3C:
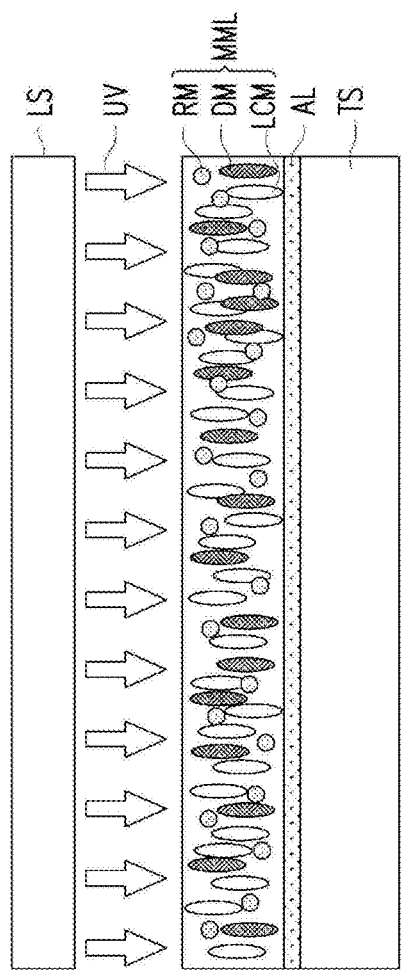
Figure 3D:
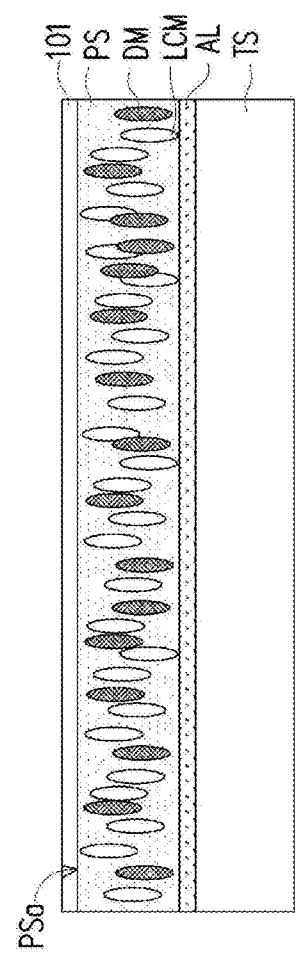

Referring to FIG. 3C and FIG. 3D, after the directional arrangement of the dye molecules DM is completed, the liquid crystal mixed material layer MML is cured to cause a polymerization reaction of the reactive monomers RM to form the polymer substrate PS. After the curing step of the liquid crystal mixed material layer MML is completed, the above-mentioned multiple liquid crystal molecules LC and multiple dye molecules DM are dispersedly arranged in the polymer substrate PS, and an arrangement direction thereof is fixed to the direction perpendicular to the substrate surface PSa of the polymer substrate PS. In the embodiment, the curing step of the liquid crystal mixed material layer MML may include performing an ultraviolet light irradiation procedure on the liquid crystal mixed material layer MML. For example, ultraviolet light UV generated by a light source LS is used to irradiate the liquid crystal mixed material layer MML formed on the temporary substrate TS, and a length of an irradiation time depends on an addition concentration of the reactive monomers RM.

However, the invention is not limited thereto, in other embodiments, the curing step of the liquid crystal mixed material layer MML may also be performed by means of heating and curing. In other words, the reactive monomers RM may also be a thermal curing material. It should be understood that in order to effectively trigger the polymerization reaction of the reactive monomers RM, the liquid crystal mixed material layer MML may selectively include a photo initiator. On the other hand, in order to adjust physical properties (such as a refractive index or a mechanical strength) of the polymer substrate PS, the liquid crystal mixed material layer MML may further include a cross-linking agent.

In the embodiment, a manufacturing method of the viewing angle limiting device 100 may further include forming a protective layer 101 on the substrate surface PSa of the polymer substrate PS. The protective layer 101 may be a hard coat, a low-reflection film, an anti-reflection film, an anti-smudge film, an anti-fingerprint film, an anti-glare film, an anti-scratch film, or a composite film layer of the above films, but the invention is not limited thereto. Referring to FIG. 3E and FIG. 3F, in order to achieve lightness and thinness of the viewing angle limiting device 100, the manufacturing method of the viewing angle limiting device 100 of the embodiment may further include removing the temporary substrate TS and the alignment film AL from another substrate surface PSb of the polymer substrate PS and forming another protective layer 102 on the substrate surface PSb, but the invention is not limited thereto. In other embodiments, the temporary substrate TS may also be reserved as a support substrate of the viewing angle limiting device. In this way, the viewing angle limiting device 100 of the embodiment is completed. The electronically controlled viewing angle switch 200 will be exemplarily described below.

Referring to FIG. 2A to FIG. 2D and FIG. 4, the electrically controlled viewing angle switch 200 of the embodiment includes a first substrate 201, a second substrate 202, a first electrode E1, a second electrode E2, and a liquid crystal layer LCL. The first electrode E1 and the second electrode E2 disposed oppositely are respectively disposed on the first substrate 201 and the second substrate 202. The first electrode E1 and the second electrode E2 are, for example, surface electrodes, but the invention is not limited thereto. The liquid crystal layer LCL is disposed between the first electrode E1 and the second electrode E2, and includes a plurality of liquid crystal molecules LC. A material of the first substrate 201 and the second substrate 202 includes glass, quartz, organic polymer, or other suitable transparent materials. On the other hand, the first electrode E1 and the second electrode E2 are, for example, light transmissive electrodes, and a material of the light transmissive electrodes includes indium tin oxide, indium zinc oxide, aluminum tin oxide, aluminum zinc oxide, or other suitable oxides, extremely thin metals, metal mesh or wire grid, carbon nanotubes, Ag nano-wires, graphene, or a stacked layer of at least two of the above materials.

For example, when a voltage is applied between the first electrode E1 and the second electrode E2, the voltage may produce an electric field between the two electrodes to drive the liquid crystal molecules LC of the liquid crystal layer LCL to rotate. In other words, through different electric field magnitudes and distributions, optical axes (or long axes) of the multiple liquid crystal molecules LC may be changed to adjust a polarization state of a light beam coming from the viewing angle limiting device 100, so as to switch the display device 10 between different anti-peep modes or between the anti-peep mode in one direction and the sharing mode. It should be noted that since the first electrode E1 and the second electrode E2 are surface electrodes, the liquid crystal molecules LC of the liquid crystal layer LCL may be evenly rotated to a substantial same direction, and do not have completely different rotation directions due to differences in positions.

In order to make the optical axes of the liquid crystal molecules LC of the liquid crystal layer LCL to be arranged in a specific direction without a function of an external electric field (i.e., when no voltage is applied between the two electrodes), the electronically controlled viewing angle switch 200 further includes an alignment film AL1 and an alignment film AL2. The alignment film AL1 is disposed between the first electrode E1 and the liquid crystal layer LCL, the alignment film AL2 is disposed between the second electrode E2 and the liquid crystal layer LCL, and the liquid crystal layer LCL is sandwiched between the alignment film AL1 and the alignment film AL2. Referring to FIG. 4 at the same time, the alignment film AL1 and the alignment film AL2 respectively have an alignment direction AD1 and an alignment direction AD2. In the embodiment, the alignment direction AD1 is parallel to the direction Y, and the alignment direction AD2 is parallel to the direction X, i.e., the alignment direction AD1 is substantially perpendicular to the alignment direction AD2. More specifically, the liquid crystal molecules LC of the liquid crystal layer LCL are arranged between the two alignment films in a manner of twist deformation.

In the embodiment, the alignment film AL1 is located between the liquid crystal layer LCL and the viewing angle limiting device 100, the alignment film AL2 is located between the liquid crystal layer LCL and the polarizer 310, and the alignment direction AD2 of the alignment film AL2 is parallel or perpendicular to the axial direction (for example, the direction X) of an absorption axis A of the polarizer 310 of the nearby electrically controlled viewing angle switch 200, but the invention is not limited thereto. Particularly, the axial direction of the absorption axis A of the polarizer 310 may define a first viewing angle control direction VD1 of the display device 10 (as shown in FIG. 2A), and the direction perpendicular to the absorption axis A of the polarizer 310 may define a second viewing angle control direction VD2 of the display device 10 (as shown in FIG. 2D). More specifically, the display device 10 of the embodiment may be, for example, switched between anti-peep modes of different dimensions (for example, an XZ plane and a YZ plane). The anti-peep operation of the display device 10 is exemplarily described below.

Figure 2B:
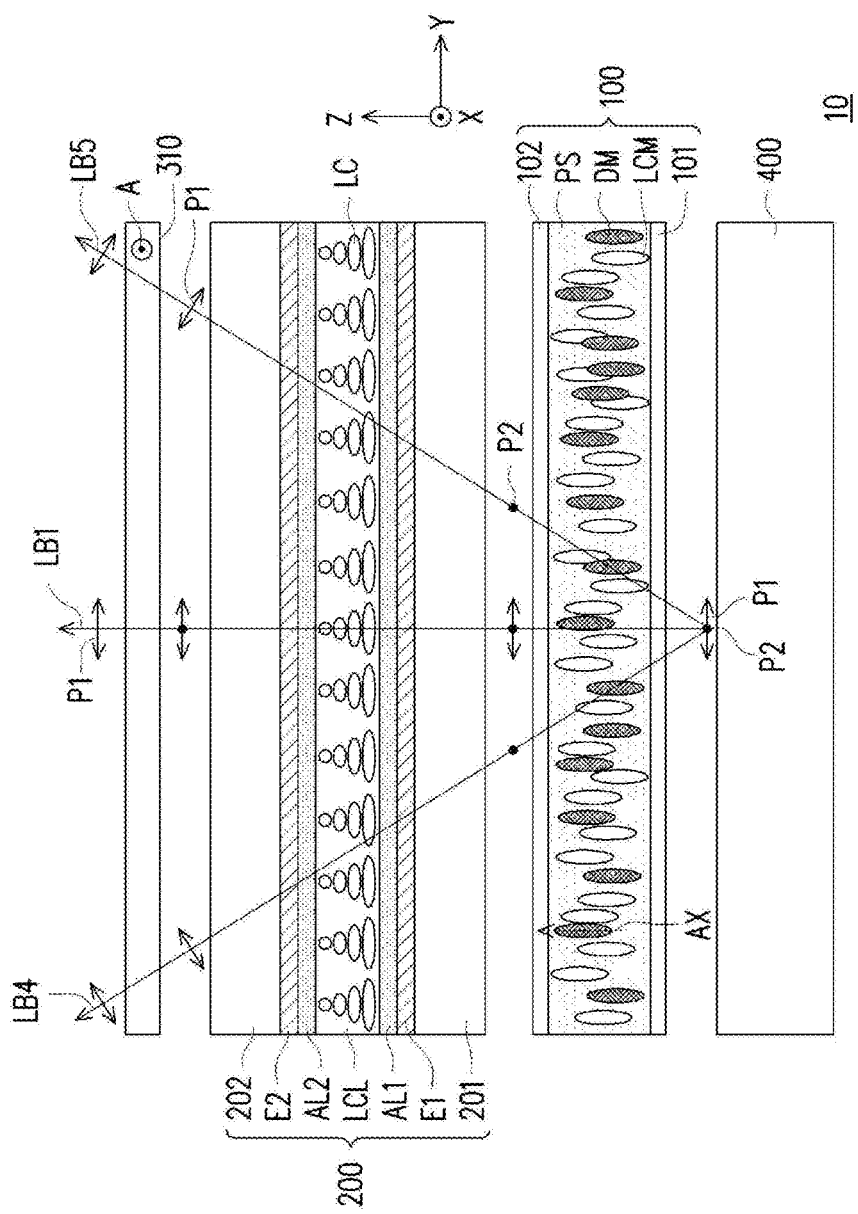
Figure 2C:
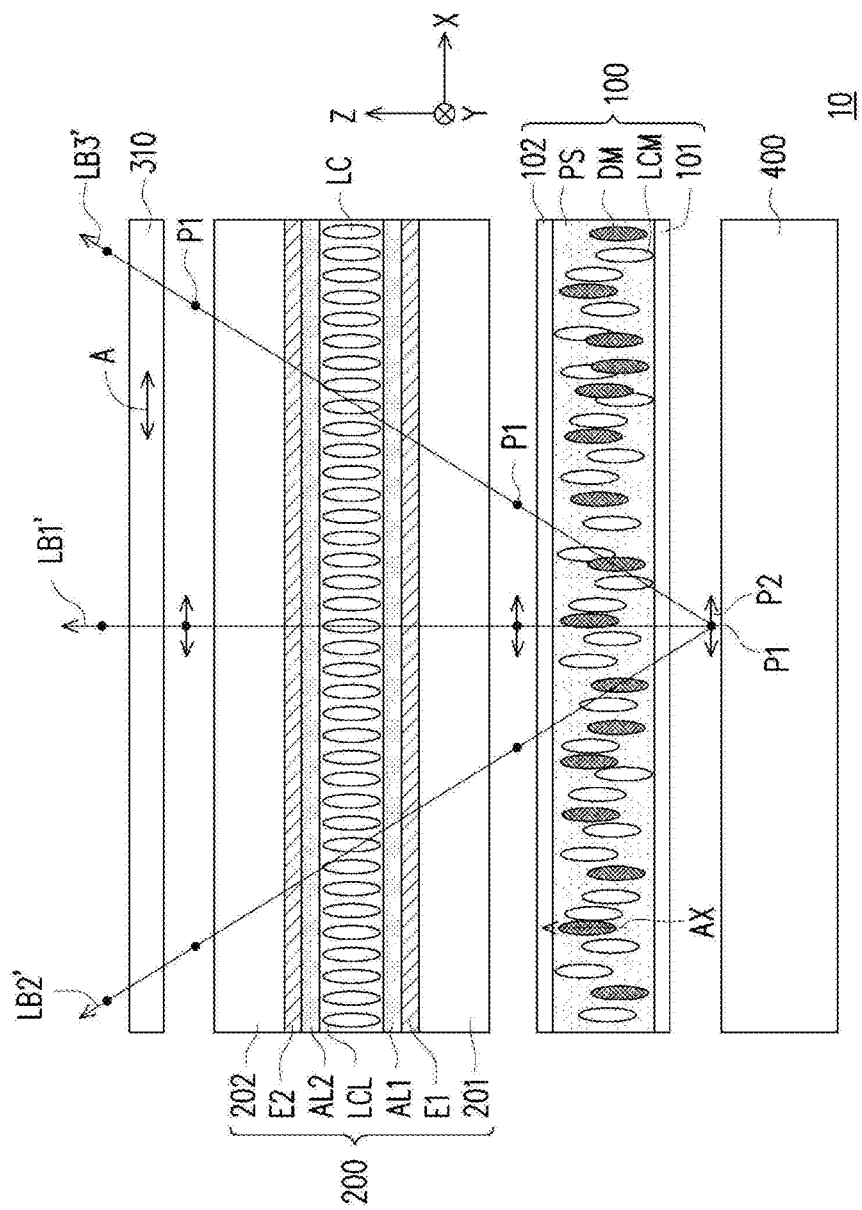
Figure 2D:
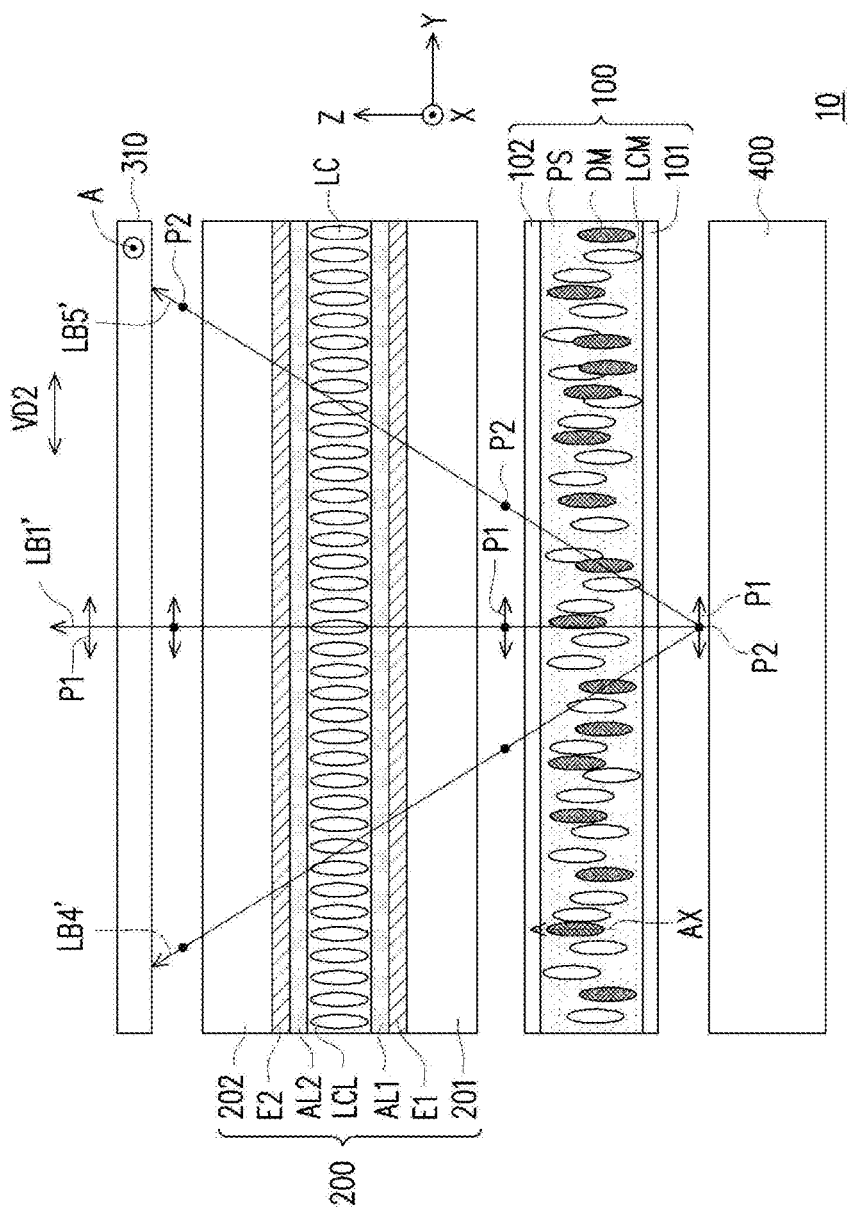

Referring to FIG. 2A to FIG. 2D, regarding a non-polarized light beam coming from the backlight module 400, a light component thereof with an electric field polarization direction not perpendicular to the axial direction of the absorption axes AX of the dye molecules DM may be absorbed by the dye molecules DM. In other words, only the light components with the electric field polarization direction perpendicular to the axial direction of the absorption axes AX of the dye molecules DM may pass through the dye molecules DM. Therefore, the light beam passing through the viewing angle limiting device 100 only has a polarization direction perpendicular to the absorption axes AX of the dye molecules DM. For example, FIG. 2A and FIG. 2B are respectively schematic cross-sectional views of the display device 10 in the XZ plane and the YZ plane when operating in a first anti-peep mode. As shown in FIG. 2A, on the XZ plane, a light beam LB1 coming from the backlight module 400 still keeps an original non-polarized state (a propagating direction of the light beam LB1 is parallel to the absorption axes AX of the dye molecules DM) after being incident forward and passing through the viewing angle limiting device 100, and a light beam LB2 (or a light beam LB3) coming from the backlight module 400 has a first linear polarization P1 after being incident obliquely and passing through the viewing angle limiting device 100.

Since a light path length of the light beam with a different incident angle in the viewing angle limiting device 100 is different, a degree of absorption of the light component of a second linear polarization P2 is also different, for example: the larger the incident angle of the light beam is, the more the light component of the second linear polarization P2 is absorbed by the dye molecules DM. Therefore, the viewing angle limiting device 100 may have a large viewing angle filtering effect. According to another aspect, the filtering effect of the viewing angle limiting device 100 at the side viewing angle may be adjusted through an addition concentration of the dye molecules DM, the absorption coefficient, or a film thickness of the polymer substrate PS.

When the display device 10 is operated in the first anti-peep mode, as shown in FIG. 2A and FIG. 2B, no voltage is applied between the first electrode E1 and the second electrode E2 of the electronically controlled viewing angle switch 200, and the liquid crystal molecules LC of the liquid crystal layer LCL are arranged between the alignment film AL1 and the alignment film AL2 in the manner of twist deformation. Therefore, after the light beam from the viewing angle limiting device 100 passes through the electronically controlled viewing angle switch 200, a polarization direction of a polarization state thereof may be changed due to the arrangement of the liquid crystal molecules LC, for example, the polarization direction of the light beam is turned by 90 degrees.

For example, as shown in FIG. 2A, on the XZ plane, the light beam LB1 from the viewing angle limiting device 100 still maintains the original non-polarized state after passing through the electronically controlled viewing angle switch 200. Therefore, the light component of the light beam LB1 in the direction perpendicular to the absorption axis A of the polarizer 310 may pass through the polarizer 310. After the light beam LB2 (or the light beam LB3) from the viewing angle limiting device 100 passes through the electronically controlled viewing angle switch 200, the first linear polarization P1 thereof may be changed into the second linear polarization P2. Since an orthogonal projection of the polarization direction of the second linear polarization P2 on the polarizer 310 is parallel to the axial direction of the absorption axis A of the polarizer 310, the light beam LB2 (or the light beam LB3) from the electronically controlled viewing angle switch 200 is absorbed and cannot pass through the polarizer 310.

On the other hand, as shown in FIG. 2B, on the YZ plane, after a light beam LB4 (or a light beam LB5) from the viewing angle limiting device 100 passes through the electronically controlled viewing angle switch 200, the second linear polarization P2 thereof may be changed into the first linear polarization P1. Since an orthogonal projection of the polarization direction of the first linear polarization P1 on the polarizer 310 is perpendicular to the axial direction of the absorption axis A of the polarizer 310, the light beam LB4 (or the light beam LB5) from the electronically controlled viewing angle switch 200 may directly pass through the polarizer 310. More specifically, the display device 10 at this time has the first viewing angle control direction VD1 parallel to the direction X on the XZ plane (as shown in FIG. 2A), and on the YZ plane, the display device 10 is in the sharing mode, as shown in FIG. 5A.

When the display device 10 is operated in a second anti-peep mode, as shown in FIG. 2C, FIG. 2C is a schematic cross-sectional view of the display device 10 in the XZ plane when operating in the second anti-peep mode. On the XZ plane, a voltage is applied between the first electrode E1 and the second electrode E2 of the electronically controlled viewing angle switch 200. Under a function of an electric field, the axial direction of the optical axes of the liquid crystal molecules LC of the liquid crystal layer LCL is substantially perpendicular to film surfaces of the alignment film AL1 and the alignment film AL2. Therefore, after the light beam from the viewing angle limiting device 100 passes through the electronically controlled viewing angle switch 200, the polarization direction of the polarization state thereof is substantially not changed due to the arrangement of the liquid crystal molecules LC.

For example, a light beam LB1' from the viewing angle limiting device 100 still maintains the original non-polarized state after passing through the electronically controlled viewing angle switch 200. Therefore, the light component of the light beam LB1' in the direction perpendicular to the absorption axis A of the polarizer 310 may pass through the polarizer 310. A light beam LB2' (or a light beam LB3') from the viewing angle limiting device 100 still maintains the original first linear polarization P1 after passing through the electronically controlled viewing angle switch 200. Since an orthogonal projection of the polarization direction of the first linear polarization P1 on the polarizer 310 is perpendicular to the axial direction of the absorption axis A of the polarizer 310, the light beam LB2' (or the light beam LB3') from the electronically controlled viewing angle switch 200 may directly pass through the polarizer 310.

On the other hand, FIG. 2D is a schematic cross-sectional view of the display device 10 in the YZ plane when operating in the second anti-peep mode. On the YZ plane, a light beam LB4' (or a light beam LB5') from the viewing angle limiting device 100 still maintains the original second linear polarization P2 after passing through the electronically controlled viewing angle switch 200. Since an orthogonal projection of the polarization direction of the second linear polarization P2 on the polarizer 310 is parallel to the axial direction of the absorption axis A of the polarizer 310, the light beam LB4' (or the light beam LB5') from the electronically controlled viewing angle switch 200 is absorbed and cannot pass through the polarizer 310. More specifically, the display device 10 at this time has the second viewing angle control direction VD2 parallel to the direction Y on the YZ plane (as shown in FIG. 2D), and on the XZ plane, the display device 10 is in the sharing mode, as shown in FIG. 5B.

Based on the above description, through a voltage control of the electronically controlled viewing angle switch 200, the viewing angle control direction of the display device 10 may be switched between the XZ plane and the YZ plane, which helps to increase the convenience of the display device 10 in the anti-peep operation. On the other hand, by designing the first absorption coefficient of the dye molecules DM of the viewing angle limiting device 100 to be significantly greater than the second absorption coefficient, and the ratio of the first absorption coefficient to the second absorption coefficient to be between 10 and 1000, the filtering effect of the viewing angle limiting device 100 in the side viewing angle and a light transmittance thereof in the viewing angle range may be effectively increased, so as to improve the anti-peep performance of the display device 10 and an overall brightness of light beams of other viewing angles after exiting the display device 10.

Figure 6:
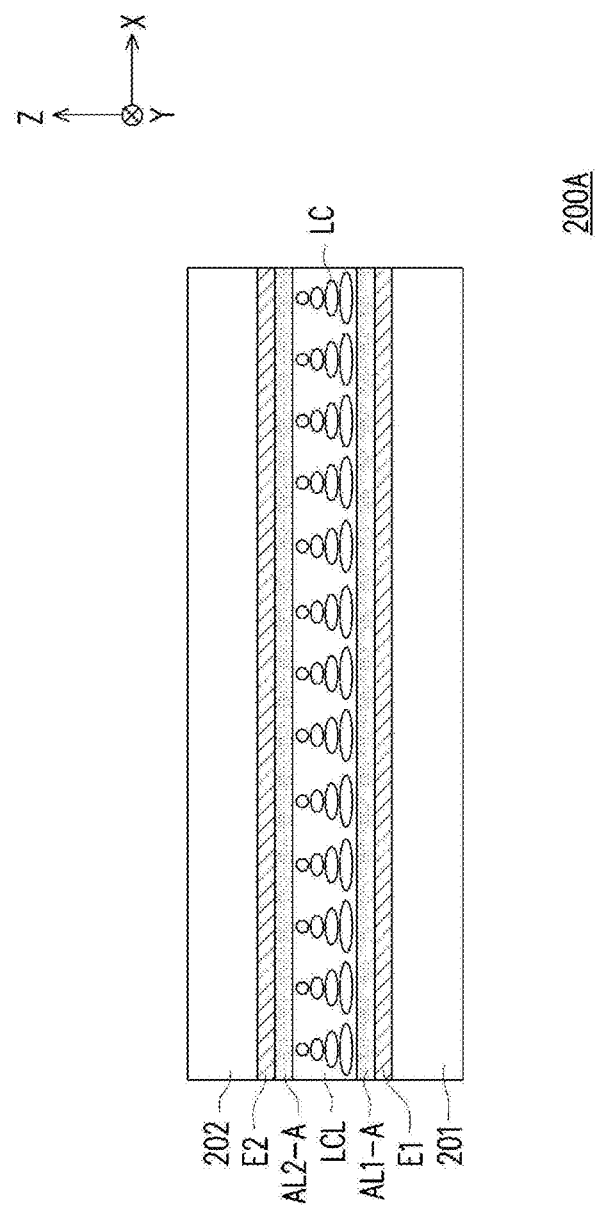
FIG. 6 is a schematic cross-sectional view of an electronically controlled viewing angle switch according to a second embodiment of the invention.
Figure 7:
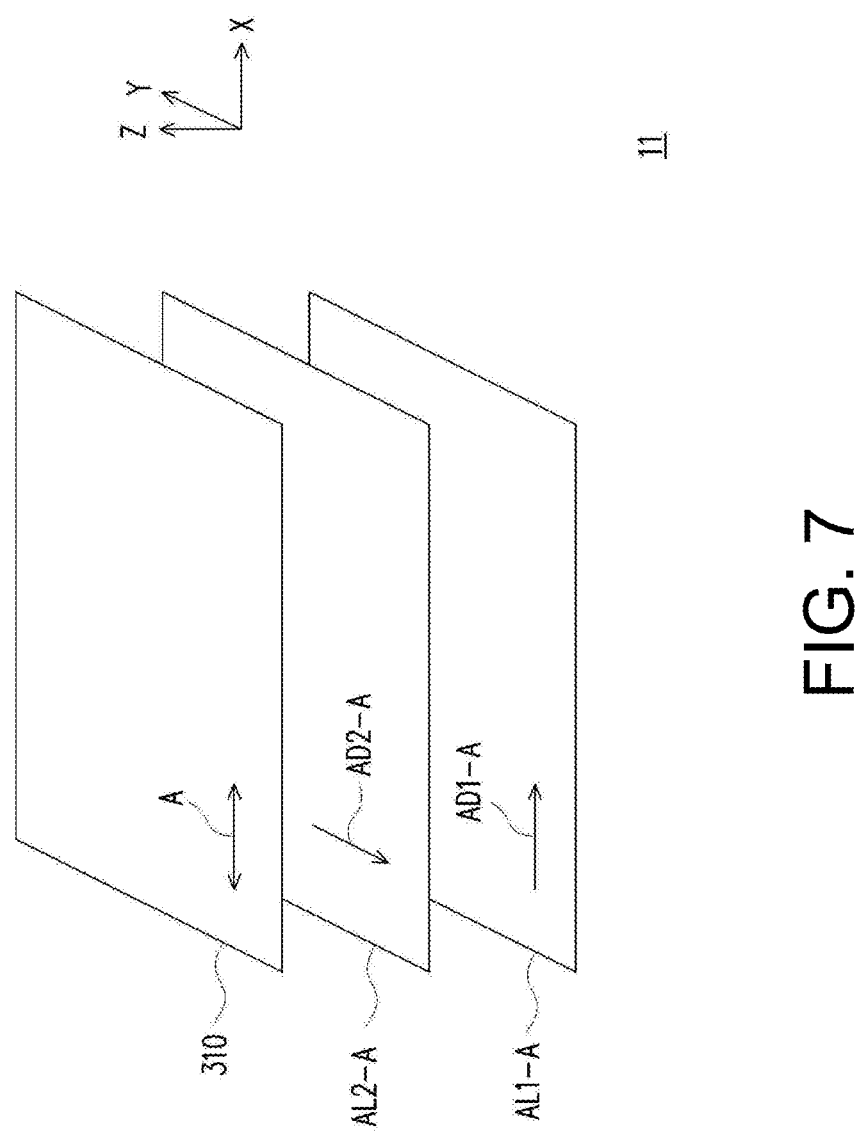
FIG. 7 is a schematic diagram of a part of film layers of a display device according to the second embodiment of the invention.
Figures 8A, 8B:
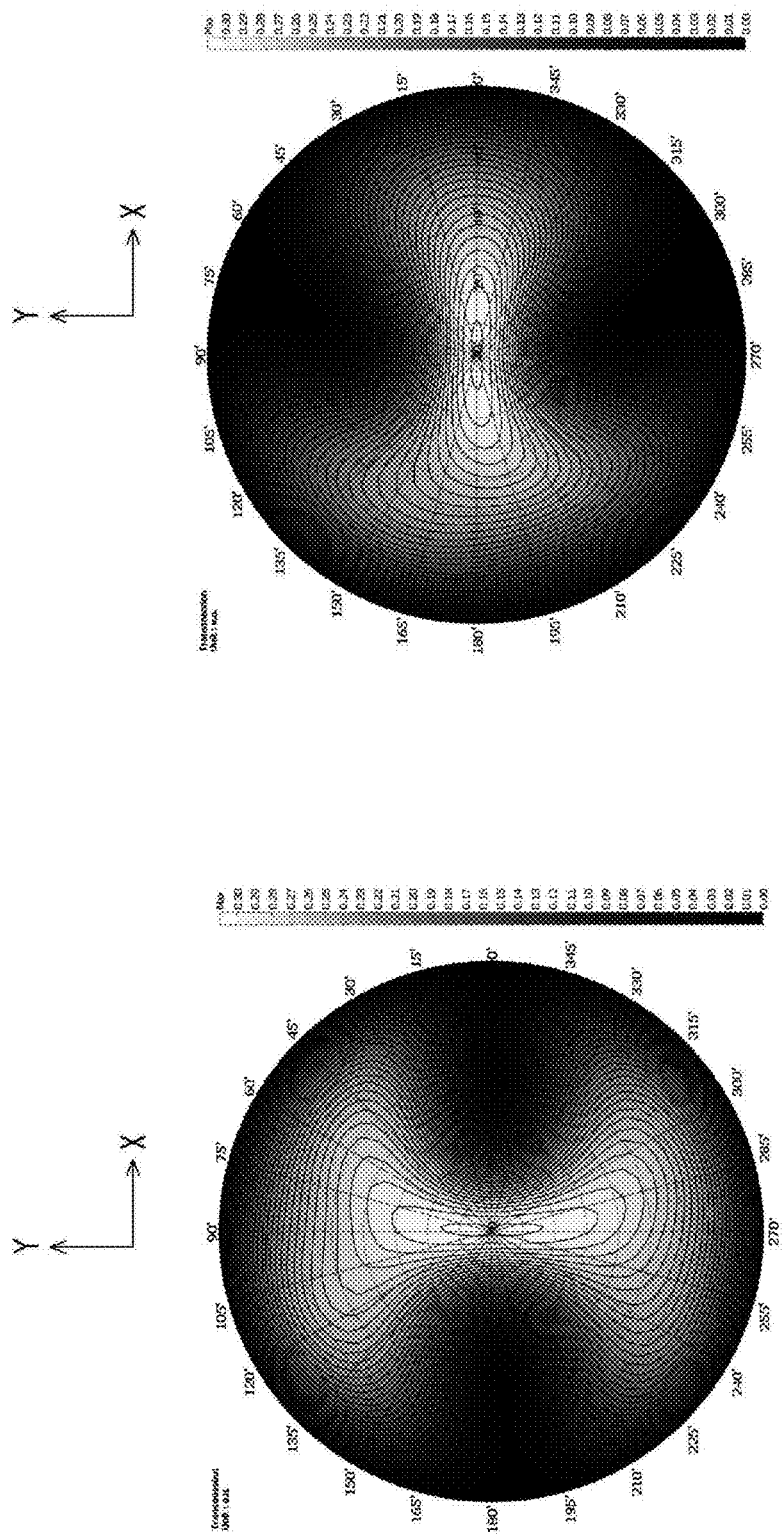
FIG. 8A and FIG. 8B are transmittance distribution diagrams of the display device operated in different anti-peep modes according to the second embodiment of the invention.

FIG. 6 is a schematic cross-sectional view of an electronically controlled viewing angle switch according to a second embodiment of the invention. FIG. 7 is a schematic diagram of a part of film layers of a display device according to the second embodiment of the invention. FIG. 8A and FIG. 8B are transmittance distribution diagrams of the display device operated in different anti-peep modes according to the second embodiment of the invention. Referring to FIG. 6 and FIG. 7, a difference between a display device 11 of the embodiment and the display device 10 of FIG. 2A lies in different alignment direction of the alignment film of the electronically controlled viewing angle switch. In the embodiment, an alignment direction AD1-A of an alignment film AL1-A of an electronically controlled viewing angle switch 200A is parallel to the direction X, and an alignment direction AD2-A of an alignment film AL2-A is parallel to the direction Y. More specifically, the alignment direction AD2-A of the alignment film AL2-A of the embodiment is perpendicular to the axial direction of the absorption axis A of the polarizer 310 of the adjacent electronically controlled viewing angle switch 200A. Accordingly, the anti-peep range of the display device 11 may be reduced. For example, when the electronically controlled viewing angle switch 200A is not enabled, the viewing angle control direction (i.e., an anti-peep direction) of the display device 11 is parallel to the direction X, and the anti-peep effect thereof is substantially concentrated within a viewing angle range of an azimuth angle of 0 degrees to an azimuth angle of 180 degrees, as shown in FIG. 8A. When the electronically controlled viewing angle switch 200A is enabled, the viewing angle control direction of the display device 11 is parallel to the direction Y, and the anti-peep effect thereof is substantially concentrated within a viewing angle range of an azimuth angle of 90 degrees to an azimuth angle of 270 degrees, as shown in FIG. 8B.

Some other embodiments are provided below to describe the invention in detail, in which the same components are indicated by the same symbols, and the description of the same technical content will be omitted. Please refer to the aforementioned embodiments for the omitted parts, which will not be repeated.

Figure 9:
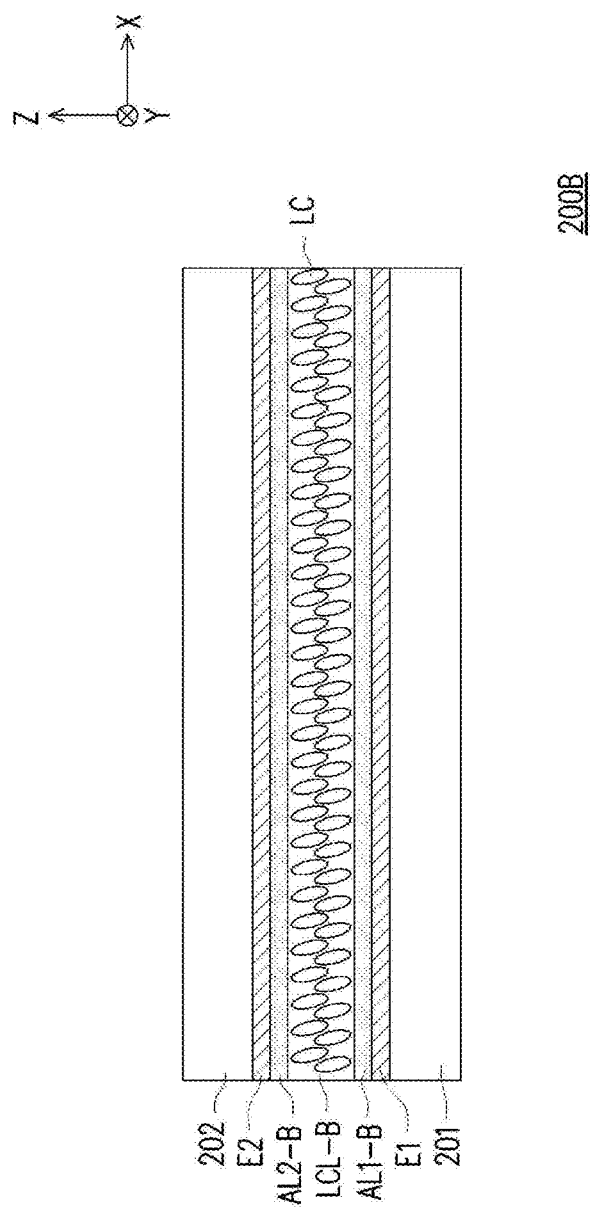
FIG. 9 is a schematic cross-sectional view of an electronically controlled viewing angle switch according to a third embodiment of the invention.
Figure 10:
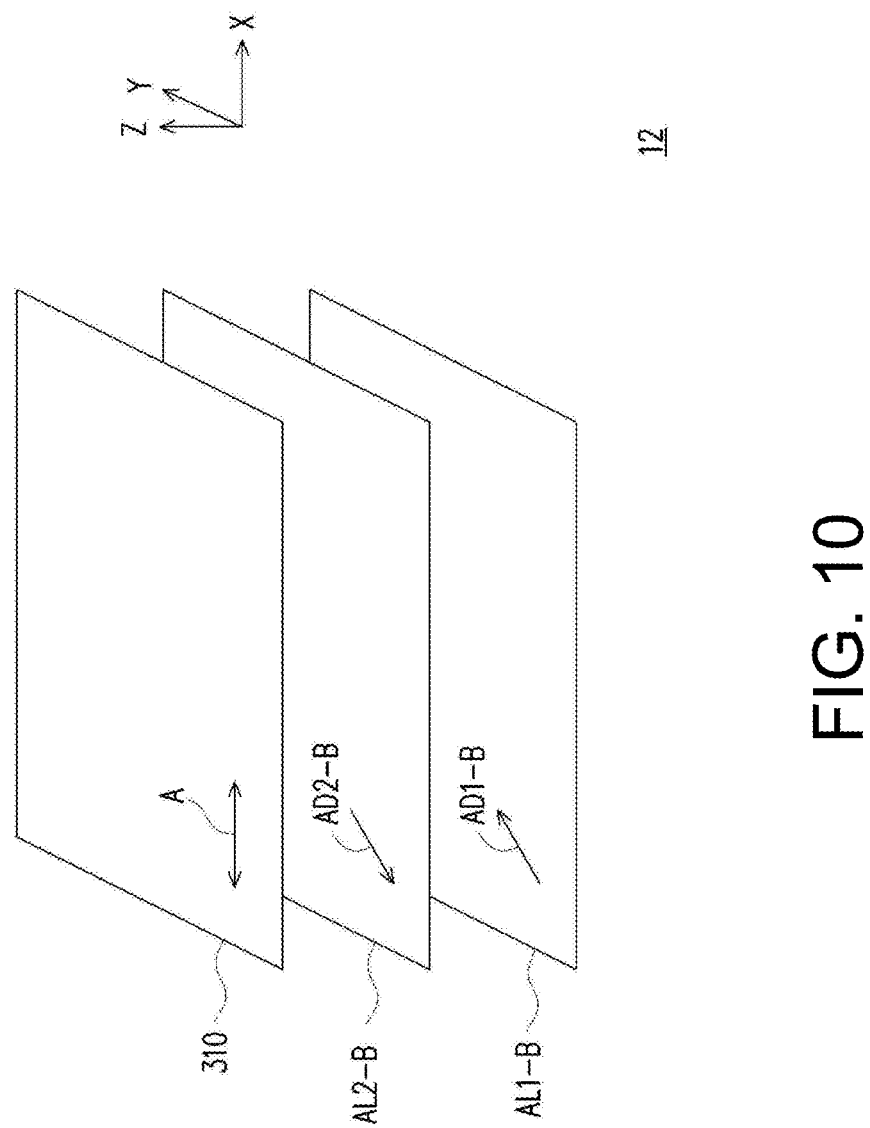
FIG. 10 is a schematic diagram of a part of film layers of a display device according to the third embodiment of the invention.
Figure 11:
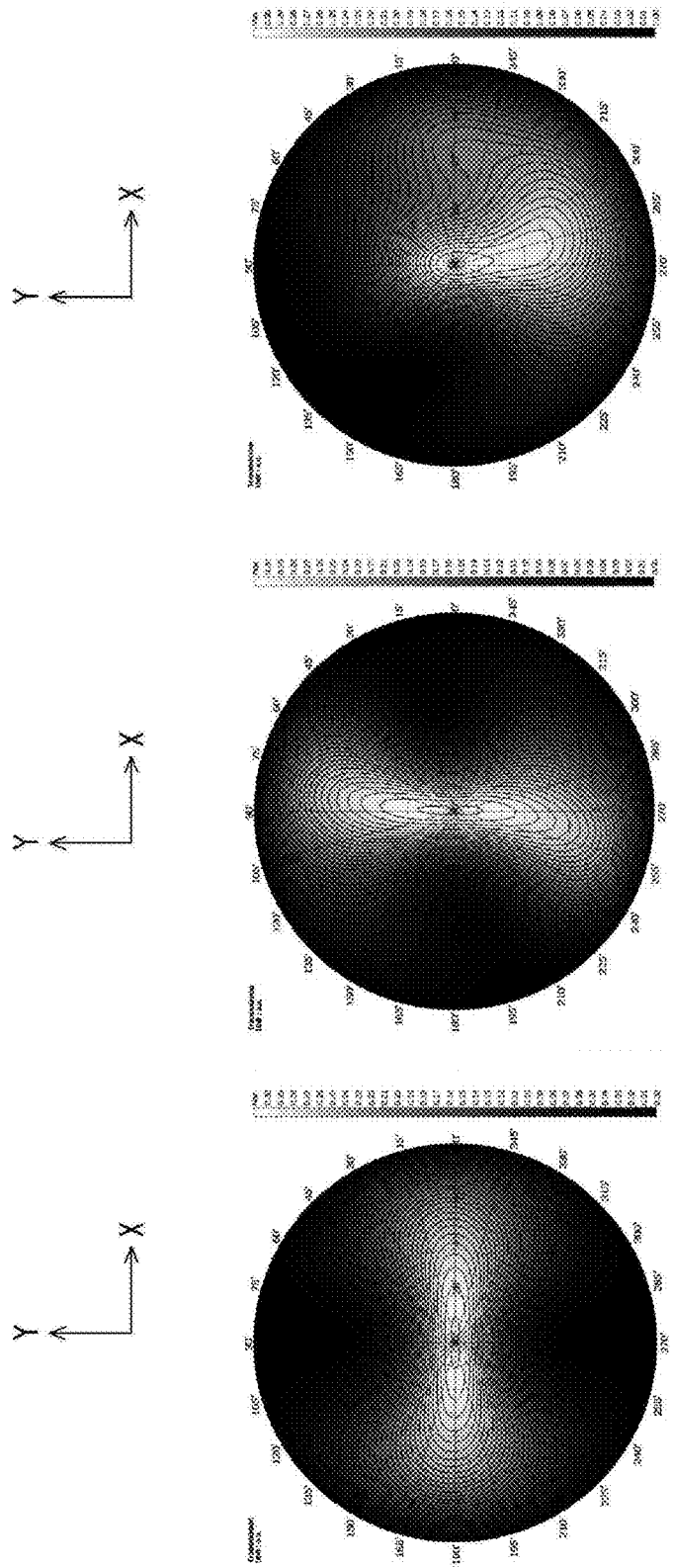
FIG. 11A to FIG. 11C are transmittance distribution diagrams of the display device operated in different anti-peep modes according to the third embodiment of the invention.
Figure 12:
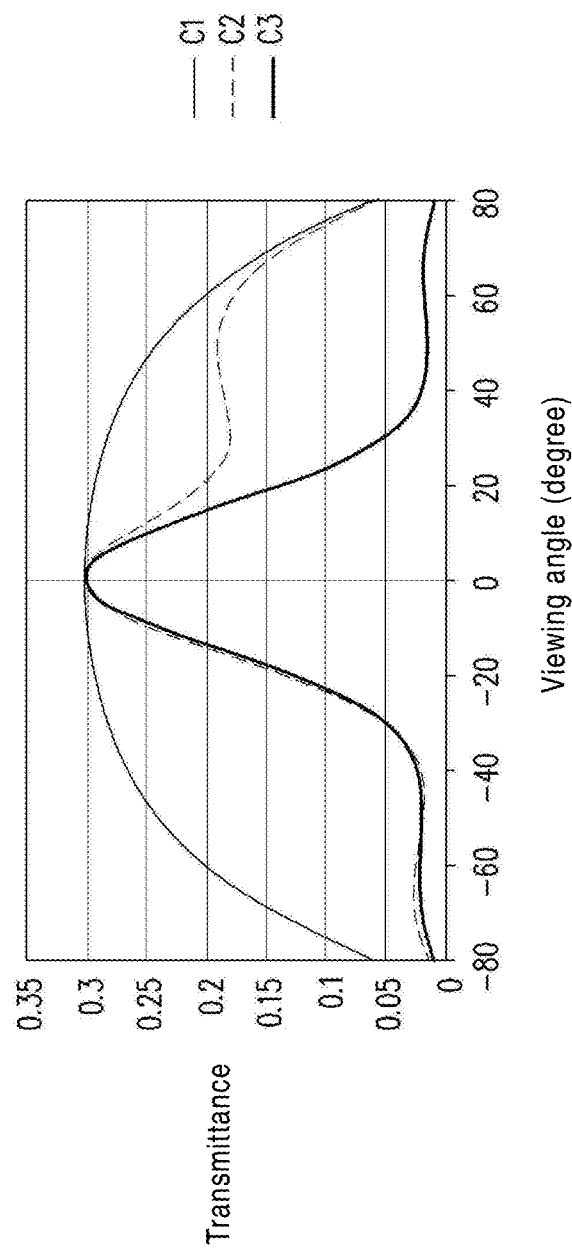
FIG. 12 is a diagram illustrating viewing angle-transmittance curves of the display device in a horizontal direction according to the third embodiment of the invention.

FIG. 9 is a schematic cross-sectional view of an electronically controlled viewing angle switch according to a third embodiment of the invention. FIG. 10 is a schematic diagram of a part of film layers of a display device according to the third embodiment of the invention. FIG. 11A to FIG. 11C are transmittance distribution diagrams of the display device operated in different anti-peep modes according to the third embodiment of the invention. FIG. 12 is a diagram illustrating viewing angle-transmittance curves of the display device in a horizontal direction according to the third embodiment of the invention.

Referring to FIG. 9 and FIG. 10, a difference between a display device 12 of the embodiment and the display device 10 of FIG. 2A lies in different arrangement of the liquid crystal layer of the electronically controlled viewing angle switch. To be specific, the liquid crystal molecules LC of a liquid crystal layer LCL-B of an electronically controlled viewing angle switch 200B are substantially vertically arranged and sandwiched between an alignment film AL1-B and an alignment film AL2-B.

It should be understood that in order to make the liquid crystal molecules LC of the liquid crystal layer LCL-B to form a single-region arrangement, the alignment films used for vertical alignment generally still require an alignment step, such as rubbing alignment or photo alignment. Therefore, the alignment films may have a pretilt angle of 85 degrees, but the invention is not limited thereto. In the embodiment, an alignment direction AD1-B of the alignment film AL1-B is anti-parallel to an alignment direction AD2-B of the alignment film AL2-B, and an included angle between the alignment direction AD2-B of the alignment film AL2-B and the absorption axis A of the polarizer 310 is 45 degrees. In particular, the alignment direction in the embodiment refers to an orthogonal projection direction on the alignment film, for example, a direction on the XY plane.

The maximum phase retardation of the liquid crystal layer LCL-B of the electronically controlled viewing angle switch 200B of the embodiment may be a half wavelength, and the display device 12 may be switched among three anti-peep modes, but the invention is not limited thereto. To be specific, when the display device 12 is operated in the first anti-peep mode, the electronically controlled viewing angle switch 200B is not enabled (i.e., no voltage is applied between the first electrode E1 and the second electrode E2), and the viewing angle control direction (i.e., the anti-peep direction) of the display device 12 is parallel to the direction Y, as shown in FIG. 11A. When the display device 12 is operated in the second anti-peep mode, the two electrodes of the electronically controlled viewing angle switch 200B are applied with a first voltage, such as 6 volts, and the viewing angle control direction of the display device 12 is parallel to the direction X, as shown in FIG. 11B.

When the display device 12 is operated in the third anti-peep mode, a second voltage is applied to the two electrodes of the electronically controlled viewing angle switch 200B, and the second voltage is less than the first voltage, for example, the second voltage is 0.5 times of the first voltage, but the invention is not limited thereto, which may be adjusted according to different liquid crystal characteristics. At this time, the display device 12 has a single-side anti-peep effect in the direction X, as shown in FIG. 11C. It may be seen from FIG. 12 that through the voltage control of the electronically controlled viewing angle switch 200B, the display device 12 may be switched between an upper and lower dual-side anti-peep mode, a left and right dual-side anti-peep mode, and the single-side anti-peep mode in the direction X, which helps to increase the convenience and flexibility of the display device 12 in the anti-peep operation. In particular, a curve C1 in FIG. 12 is a viewing angle-transmittance distribution curve of the display device 12 in the direction X when the electronically controlled viewing angle switch 200B is not enabled, a curve C2 is a viewing angle-transmittance distribution curve of the display device 12 in the direction X when the second voltage is applied to the two electrodes of the electronically controlled viewing angle switch 200B, and a curve C3 is a viewing angle-transmittance distribution curve of the display device 12 in the direction X when the first voltage is applied to the two electrodes of the electronically controlled viewing angle switch 200B.

Figure 13:
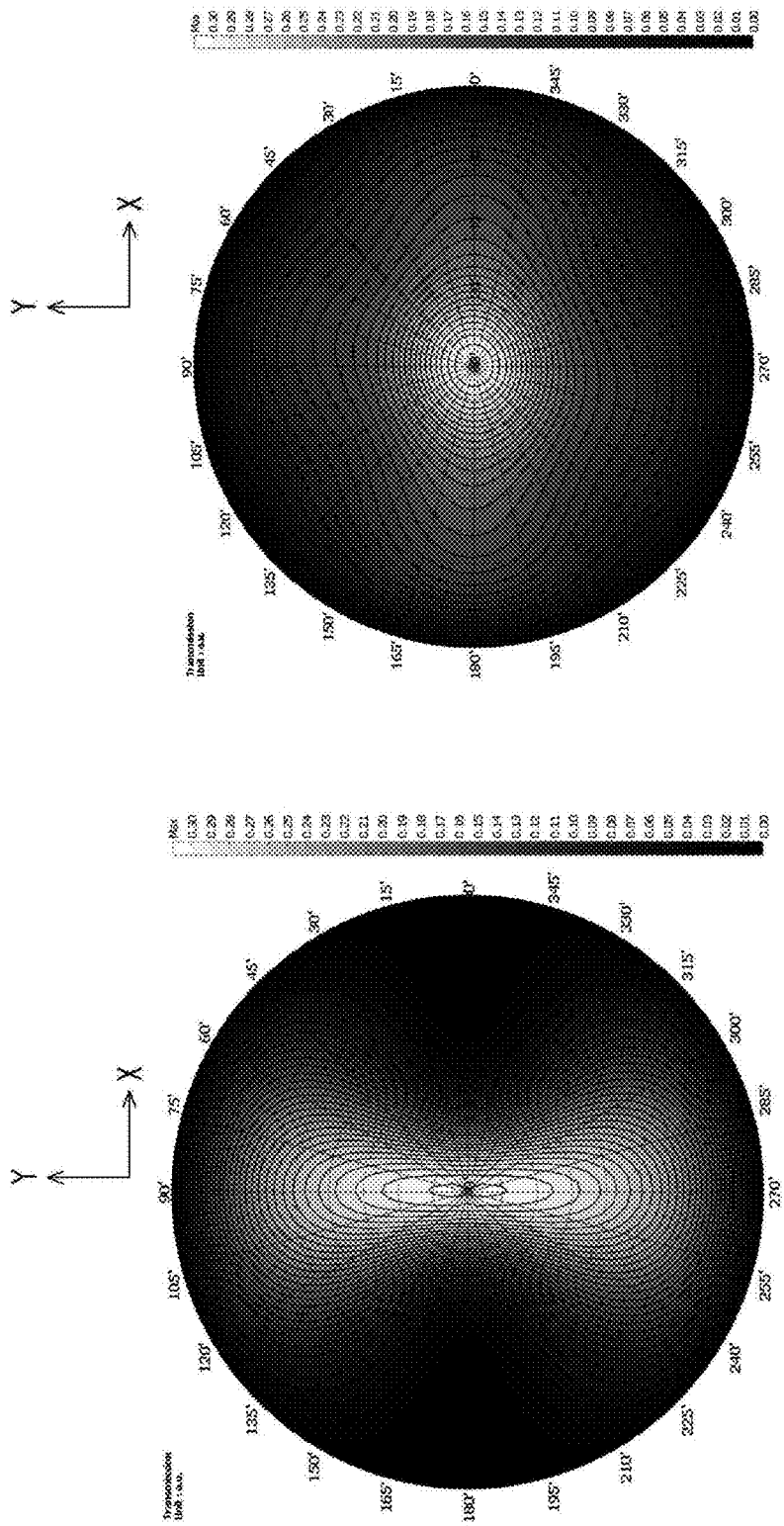
FIG. 13A and FIG. 13B are transmittance distribution diagrams of a display device operated in different modes according to a fourth embodiment of the invention.

However, the invention is not limited thereto, FIG. 13A and FIG. 13B are transmittance distribution diagrams of a display device operated in different modes according to a fourth embodiment of the invention. Referring to FIG. 13A and FIG. 13B, a main difference between an electronically controlled viewing angle switch (not shown) in the fourth embodiment and the electronically controlled viewing angle switch 200B in the third embodiment lies in the different maximum phase retardation of the liquid crystal layer. In the embodiment, the maximum phase retardation of the liquid crystal layer (not shown) of the electronically controlled viewing angle switch is a quarter wavelength. When the electronically controlled viewing angle switch is not enabled, the viewing angle control direction of the display device is parallel to the direction X, as shown in FIG. 13A.

When the electronically controlled viewing angle switch is enabled (i.e., a voltage is applied between the two electrodes), the display device is in the sharing mode, as shown in FIG. 13B. It should be noted that when the electronically controlled viewing angle switch is enabled, a part of the light beams may pass there through regardless of being in the direction X, the direction Y, or other directions, and the display device is in a full viewing angle sharing mode.

Figure 14:
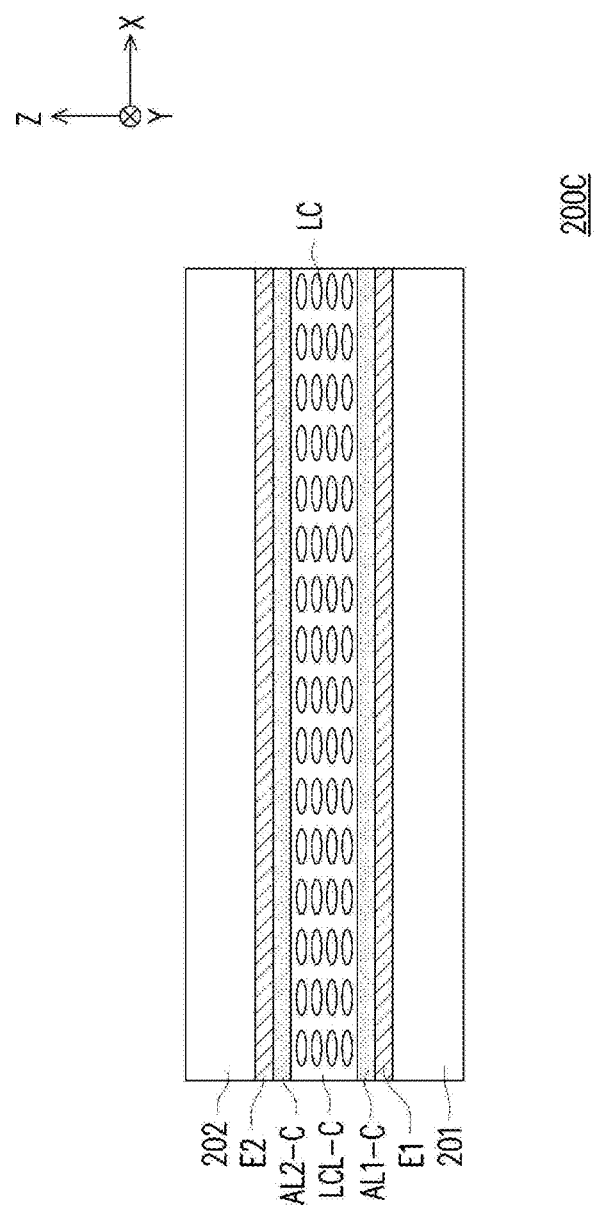
FIG. 14 is a schematic cross-sectional view of an electronically controlled viewing angle switch according to a fifth embodiment of the invention.
Figure 15:
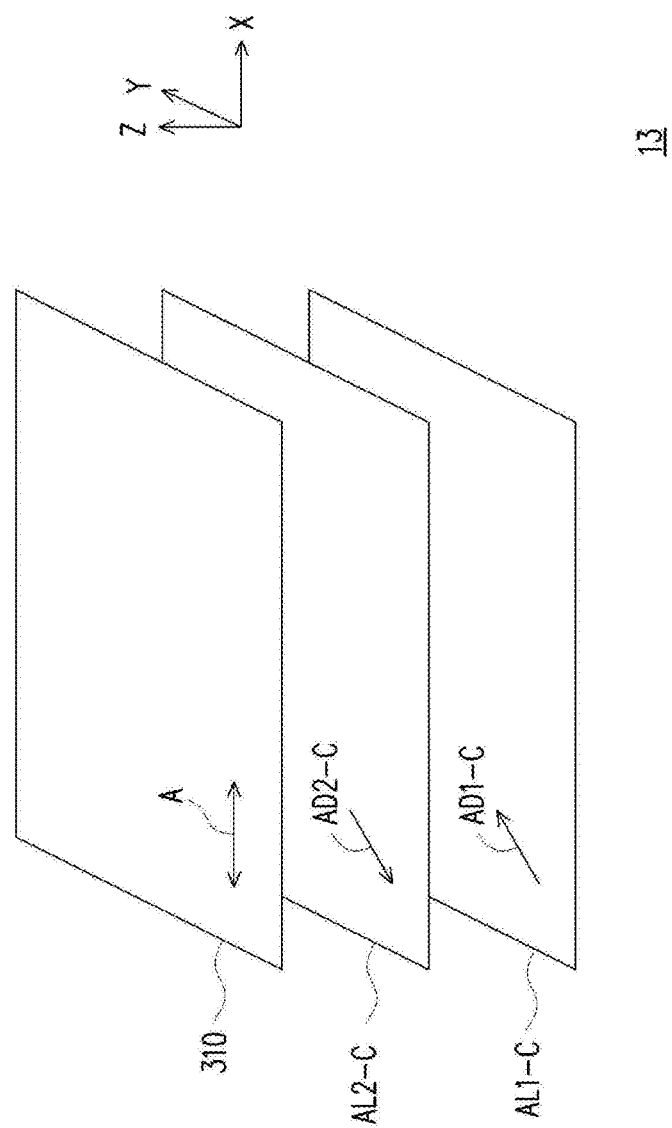
FIG. 15 is a schematic diagram of a part of film layers of a display device according to the fifth embodiment of the invention.
Figures 16A, 16B:
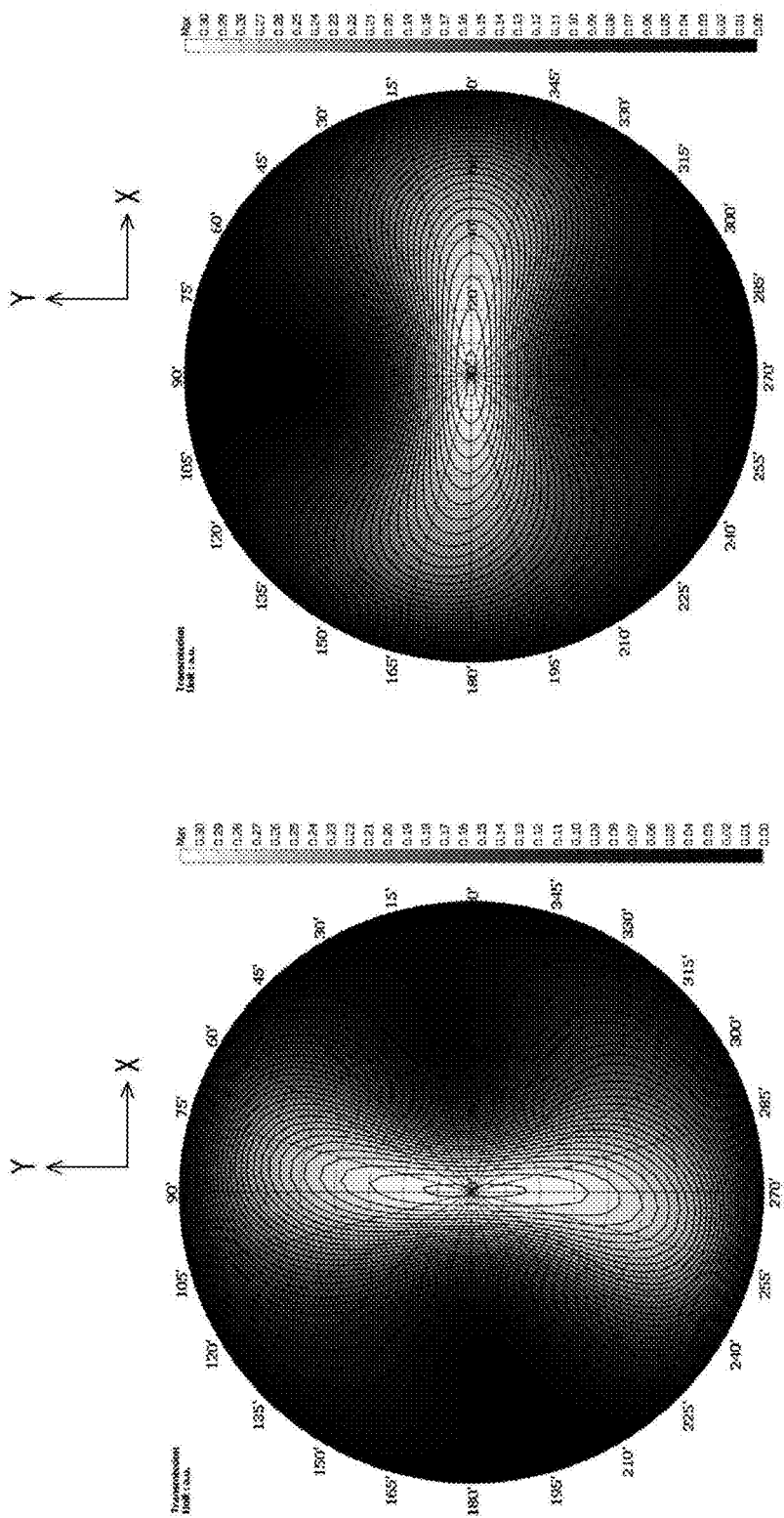
FIG. 16A and FIG. 16B are transmittance distribution diagrams of the display device operated in different anti-peep modes according to the fifth embodiment of the invention.

FIG. 14 is a schematic cross-sectional view of an electronically controlled viewing angle switch according to a fifth embodiment of the invention. FIG. 15 is a schematic diagram of a part of film layers of a display device according to the fifth embodiment of the invention. FIG. 16A and FIG. 16B are transmittance distribution diagrams of the display device operated in different anti-peep modes according to the fifth embodiment of the invention. Referring to FIG. 14 and FIG. 15, a difference between a display device 13 of the embodiment and the display device 10 of FIG. 2A lies in different arrangement of the liquid crystal layer of the electronically controlled viewing angle switch. In the embodiment, the liquid crystal molecules LC of a liquid crystal layer LCL-C of an electronically controlled viewing angle switch 200C are not arranged between an alignment film AL1-C and an alignment film AL2-C in the manner of twist deformation. On the contrary, the liquid crystal molecules LC of the liquid crystal layer LCL-C are substantially arranged in a same direction.

For example, in the embodiment, an alignment direction AD1-C of the alignment film AL1-C is anti-parallel to an alignment direction AD2-C of the alignment film AL2-C, and an included angle between the alignment direction AD2-C of the alignment film AL2-C and the absorption axis A of the polarizer 310 is 45 degrees. In particular, the maximum phase retardation of the liquid crystal layer LCL-C of the electronically controlled viewing angle switch 200C of the embodiment may be the half wavelength, and the display device 13 may be switched between two anti-peep modes, but the invention is not limited thereto. In detail, when the display device 13 is operated in the first anti-peep mode, the electronically controlled viewing angle switch 200C is not enabled (i.e., no voltage is applied between the first electrode E1 and the second electrode E2), and the viewing angle control direction (i.e., the anti-peep direction) of the display device 13 is parallel to the direction X, as shown in FIG. 16A. When the display device 13 is operated in the second anti-peep mode, a voltage is applied to the two electrodes of the electronically controlled viewing angle switch 200C, and the viewing angle control direction of the display device 13 is parallel to the direction Y, as shown in FIG. 16B.

Figure 17:
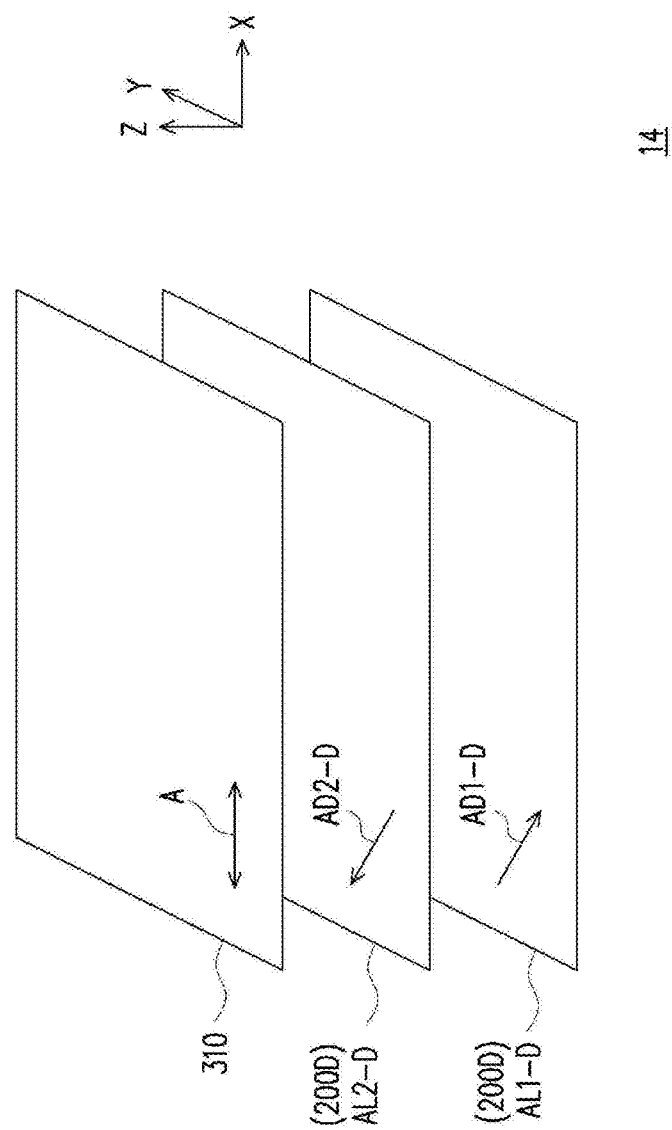
FIG. 17 is a schematic diagram of a part of film layers of a display device according to a sixth embodiment of the invention.
Figures 18A, 18B:
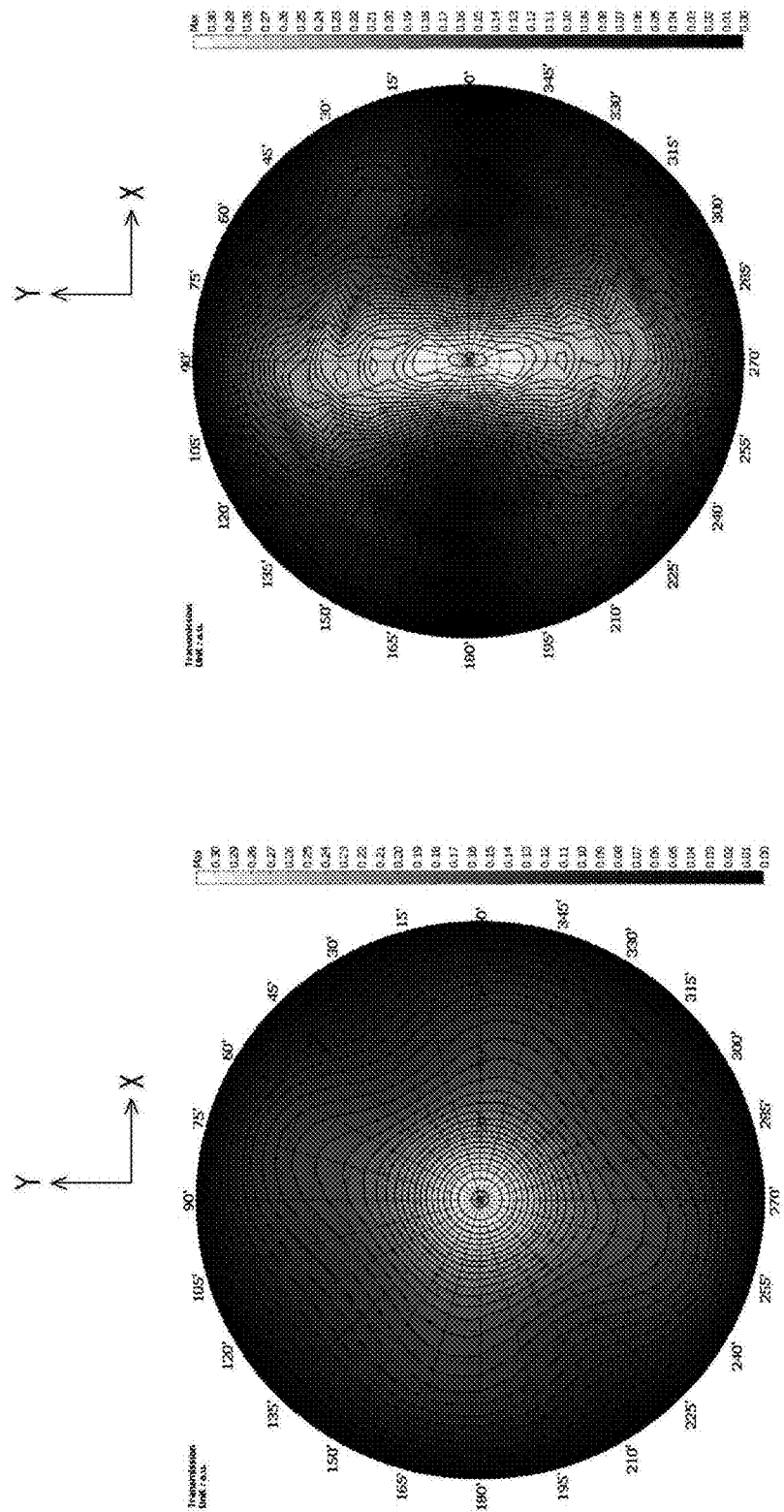
FIG. 18A and FIG. 18B are transmittance distribution diagrams of the display device operated in different modes according to the sixth embodiment of the invention.

FIG. 17 is a schematic diagram of a part of film layers of a display device according to a sixth embodiment of the invention. FIG. 18A and FIG. 18B are transmittance distribution diagrams of the display device operated in different modes according to the sixth embodiment of the invention. Referring to FIG. 17, a main difference between a display device 14 of the embodiment and the display device 13 of FIG. 15 lies in different maximum phase retardation of the liquid crystal layer of the electronically controlled viewing angle switch. To be specific, the maximum phase retardation of a liquid crystal layer (not shown) of an electronically controlled viewing angle switch 200D of the display device 14 may be greater than or equal to 3 μm.

Similar to the display device 13 of FIG. 15, an alignment direction AD1-D of an alignment film AL1-D of the electronically controlled viewing angle switch 200D of the embodiment is anti-parallel to an alignment direction AD2-D of an alignment film AL2-D, and an included angle between the alignment direction AD2-D of the alignment film AL2-D and the absorption axis A of the polarizer 310 is 45 degrees. In particular, in the embodiment, the maximum phase retardation of the liquid crystal layer of the electronically controlled viewing angle switch 200D is, for example, 10 μm, and the display device 14 may be switched between the anti-peep mode and the full viewing angle sharing mode.

For example, when the electronically controlled viewing angle switch 200D is enabled, the viewing angle control direction (i.e., the anti-peep direction) of the display device 14 is parallel to the direction X, as shown in FIG. 18B. When the electronically controlled viewing angle switch 200D is not enabled (i.e., no voltage is applied to the two electrodes), the liquid crystal molecules of the liquid crystal layer thereof (not shown) are substantially arranged in a same direction (for example, the alignment direction AD1-D or the alignment direction AD2-D). At this moment, the phase retardation of the light beam passing through the liquid crystal layer may be changed drastically along with different wavelengths. For example, when a light beam with a wavelength of 550 nm produces a phase retardation of m times of the wavelength after passing through the liquid crystal layer, a polarization state thereof is not changed and the light beam may directly pass through the polarizer 310, where m is an integer. When a light beam with a wavelength of 562 nm produces a phase retardation of (m+½) times of the wavelength after passing through the liquid crystal layer, a polarization state thereof is obviously changed, and the light beam cannot pass through the polarizer 310. In other words, when the liquid crystal layer has the maximum phase retardation of 10 μm, the wavelengths of light beams that may pass through the polarizer 310 may be evenly distributed in a visible light wavelength range, so as to achieve the effect of transmission to realize the full viewing angle sharing mode of the display device 14, as shown in FIG. 18A. It should be noted that since the phase retardation of the light beam passing through the liquid crystal layer is changed drastically along with different wavelengths, users are less likely to perceive color changes at different azimuths or viewing angles (i.e., it is less likely to produce a color shift phenomenon).

Figure 19:
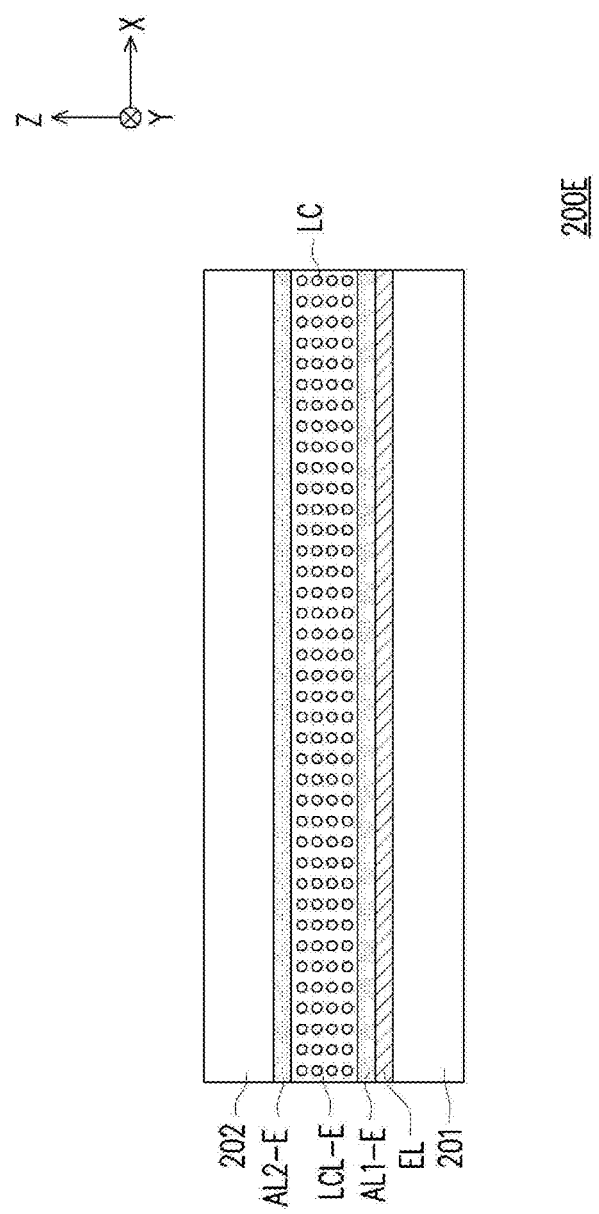
FIG. 19 is a schematic cross-sectional view of an electronically controlled viewing angle switch according to a seventh embodiment of the invention.
Figure 20:
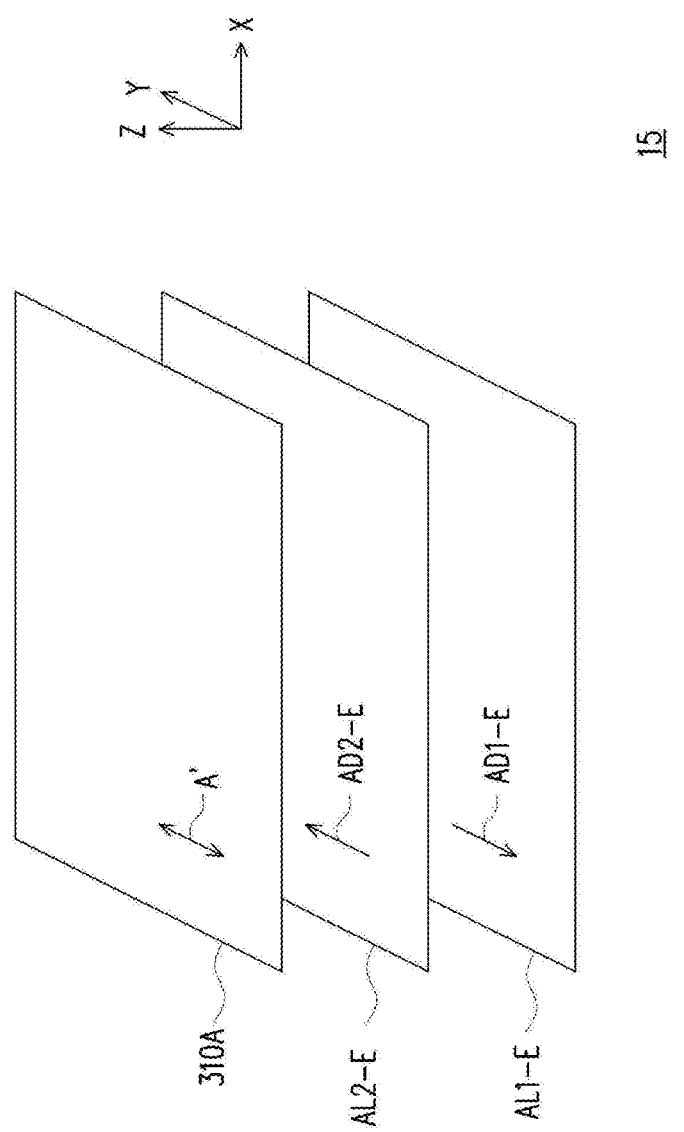
FIG. 20 is a schematic diagram of a part of film layers of a display device of the seventh embodiment of the invention.
Figure 21:
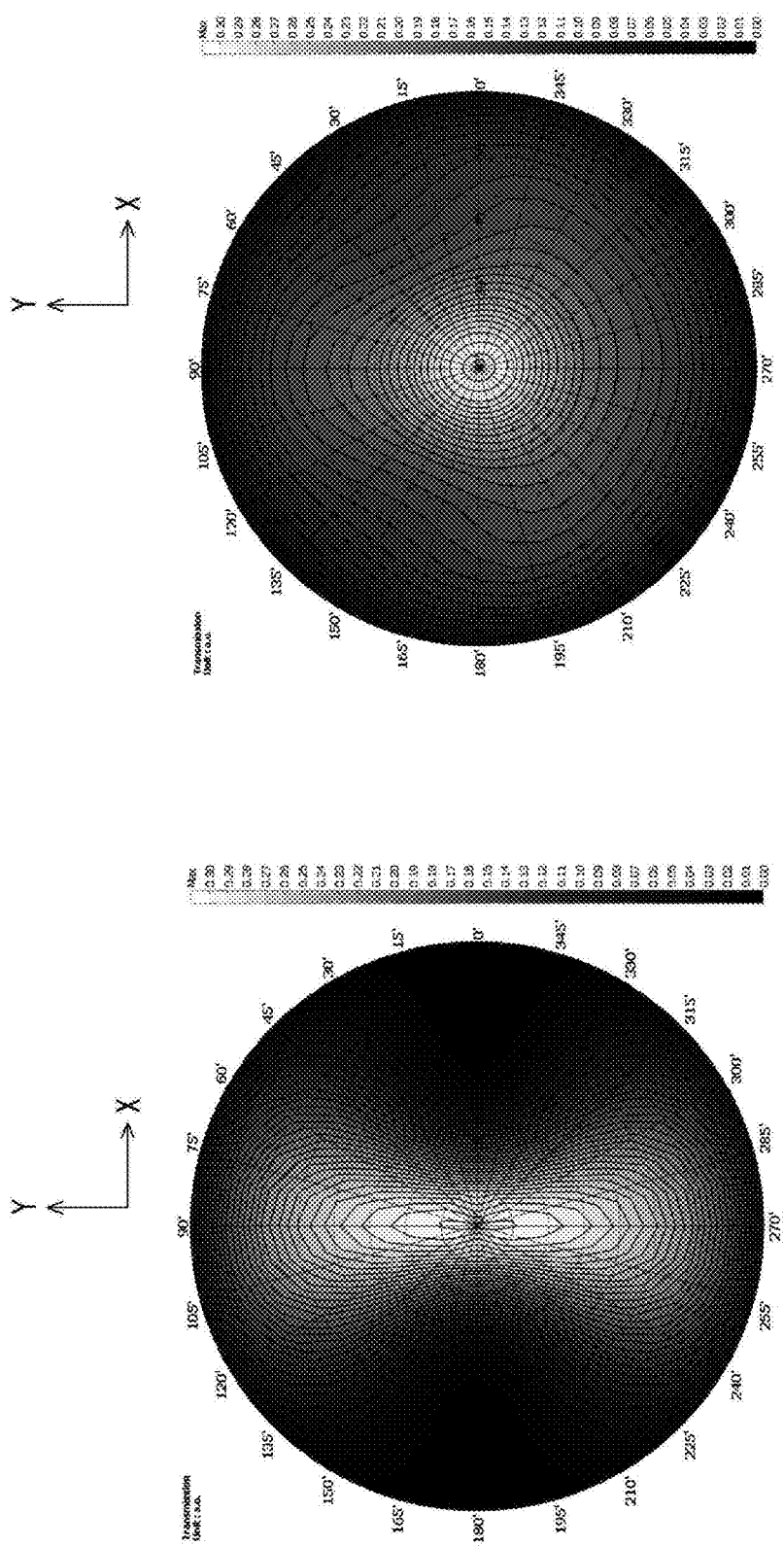
FIG. 21A and FIG. 21B are transmittance distribution diagrams of the display device operated in different modes according to the seventh embodiment of the invention.

FIG. 19 is a schematic cross-sectional view of an electronically controlled viewing angle switch according to a seventh embodiment of the invention. FIG. 20 is a schematic diagram of a part of film layers of a display device of the seventh embodiment of the invention. FIG. 21A and FIG. 21B are transmittance distribution diagrams of the display device operated in different modes according to the seventh embodiment of the invention. Referring to FIG. 19 and FIG. 20, a difference between a display device 15 of the embodiment and the display device 10 of FIG. 2A lies in different configuration of the absorption axis of the polarizer and different operation mode of the electronically controlled viewing angle switch. In the embodiment, a liquid crystal layer LCL-E of an electronically controlled viewing angle switch 200E is operated in an in-plane switching (IPS) liquid crystal mode. Namely, the two electrodes of the electronically controlled viewing angle switch 200E are arranged on a same side of the liquid crystal layer LCL-E, for example, the two electrodes are located on an electrode layer EL between the first substrate 201 and an alignment film AL1-E, and an alignment direction AD1-E of the alignment film AL1-E is anti-parallel to an alignment direction AD2-E of an alignment film AL2-E. For example, the two electrodes on the electrode layer EL may be two comb-shaped electrodes arranged in alternation with each other. In particular, in the embodiment, the two electrodes of the electrode layer EL are, for example, arranged on the same layer, but the invention is not limited thereto. In other embodiments, the two electrodes of the electrode layer EL may be arranged on different layers, and separated by an insulating layer.

Furthermore, the axial direction of the absorption axis A' of the polarizer 310A of the display device 15 closer to the electronically controlled viewing angle switch 200E is parallel to the direction Y, and the alignment direction AD1-E of the alignment film AL1-E and the alignment direction AD2-E of the alignment film AL2-E are parallel to the axial direction of the absorption axis A' of the polarizer 310A. In the embodiment, the display device 15 is configured to switch between the anti-peep mode and the full viewing angle sharing mode. For example, when the electronically controlled viewing angle switch 200E is not enabled (i.e., no voltage is applied between the two electrodes on the same electrode layer EL), the display device 15 is in the anti-peep mode, and a viewing angle control direction thereof (i.e., the anti-peep direction) is parallel to the direction X, as shown in FIG. 21A. When the electronically controlled viewing angle switch 200E is enabled, since a phase retardation generated by a part of the liquid crystal molecules LC above each of the electrodes is different from the phase retardation generated by the other part of the liquid crystal molecules LC between the two electrodes, a part of the light beams may pass there through regardless of in the direction X, the direction Y, or other directions, and the display device 15 is in the full viewing angle sharing mode, as shown in FIG. 21B.

Figure 22:
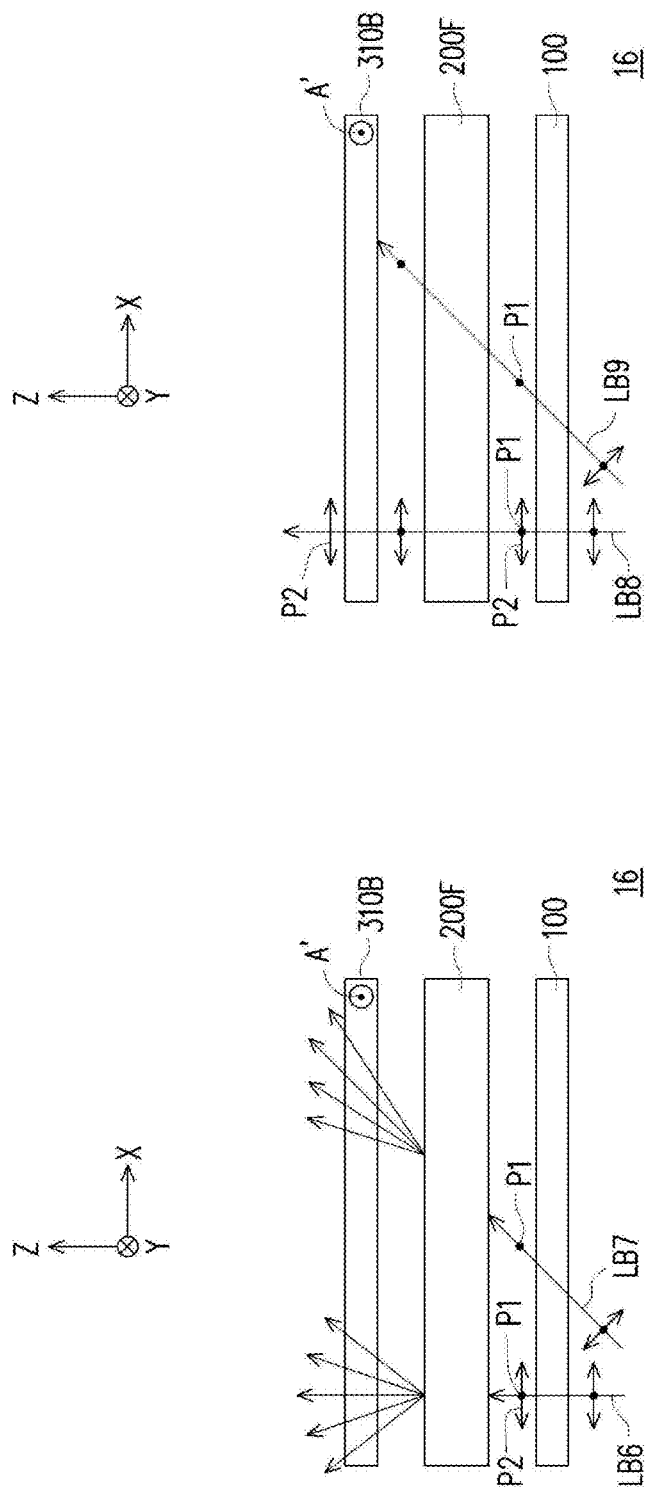
FIG. 22A and FIG. 22B are schematic cross-sectional views of a display device operated in different modes according to an eighth embodiment of the invention.

FIG. 22A and FIG. 22B are schematic cross-sectional views of a display device operated in different modes according to an eighth embodiment of the invention. Referring to FIG. 22A and FIG. 22B, a main difference between a display device 16 of the embodiment and the display device 10 of FIG. 2A lies in a different type of the electronically controlled viewing angle switch and a different configuration of the absorption axis of the polarizer. To be specific, an electrically controlled viewing angle switch 200F of the display device 16 may be an electrically controlled diffusion film, and the electrically controlled diffusion film is, for example, a polymer dispersed liquid crystal (PDLC) film, a polymer network liquid crystal (PNLC) film, or a multi-stable liquid crystal (MSLC) film. In particular, for clarity's sake, FIG. 22A and FIG. 22B omit illustration of the backlight module 400 of FIG. 2A.

In the embodiment, the axial direction of the absorption axis A' of the polarizer 310B of the display device 16 closer to the electronically controlled viewing angle switch 200F is parallel to the direction Y. The electronically controlled viewing angle switch 200F is, for example, a polymer dispersed liquid crystal film and includes two electrode layers (not shown), a polymer substrate (not shown) sandwiched between the two electrode layers, a plurality of microcapsules (not shown) dispersed in the polymer substrate, and a plurality of liquid crystal molecules (not shown) filled in the microcapsules. For example, when the electronically controlled viewing angle switch 200F is not enabled (i.e., no voltage is applied between the two electrode layers), the liquid crystal molecules located in the microcapsules are randomly arranged due to a topographic function of inner surfaces of the microcapsules. Therefore, an average refractive index of the liquid crystal molecules in the microcapsules is different from a refractive index of the polymer substrate, which causes the electronically controlled diffusion film to present a scattering state. Namely, either a light beam LB6 that is incident to the electronically controlled viewing angle switch 200F in a forward direction and has a non-polarized state or a light beam LB7 that is incident to the electronically controlled viewing angle switch 200F in an oblique direction and has the first linear polarization P1 may form a plurality of scattered light beams after passing through the electronically controlled viewing angle switch 200F. Since most of the scattered light beams are non-polarized light beams, only the light component with an electric field polarization direction parallel to the absorption axis A' of the polarizer 310B may be absorbed, and the remained light components may pass through the polarizer 310B. At this time, the display device 16 is in the full viewing angle sharing mode. It should be noted that by using the electronically controlled diffusion film as the electronically controlled viewing angle switch 200F, the viewing angle range (for example, in the direction X) of the display device 16 in the sharing mode may be further increased.

On the other hand, when the electronically controlled viewing angle switch 200F is enabled, the liquid crystal molecules located in the microcapsules are substantially arranged along a direction of the electric field under the function of the electric field formed between the two electrode layers. At this time, the average refractive index of the liquid crystal molecules in the microcapsules is substantially equal to the refractive index of the polymer substrate, so that the electronically controlled diffuser film (i.e., the electronically controlled viewing angle switch 200F) presents a transparent state. Therefore, the light beam from the viewing angle limiting device 100 still maintains the original non-polarized state or polarization state after passing through the electronically controlled viewing angle switch 200F. For example, a light beam LB8 coming from the viewing angle limiting device 100 and incident to the electronically controlled viewing angle switch 200F in a forward direction still maintains the original non-polarized state after passing through the electronically controlled viewing angle switch 200F, and the light beam LB8 passes through the polarizer 310B after losing a part of light components (i.e., the light components with the electric field polarization direction parallel to the absorption axis A' of the polarizer 310B). The light beam LB9 from the viewing angle limiting device 100 and obliquely incident to the electronically controlled viewing angle switch 200F cannot pass through the polarizer 310B due to that it maintains the original first linear polarization P1 after passing through the electronically controlled viewing angle switch 200F. At this time, the display device 16 is in the anti-peep mode, and the viewing angle control direction (i.e., the anti-peep direction) is parallel to the direction X.

Figure 23:
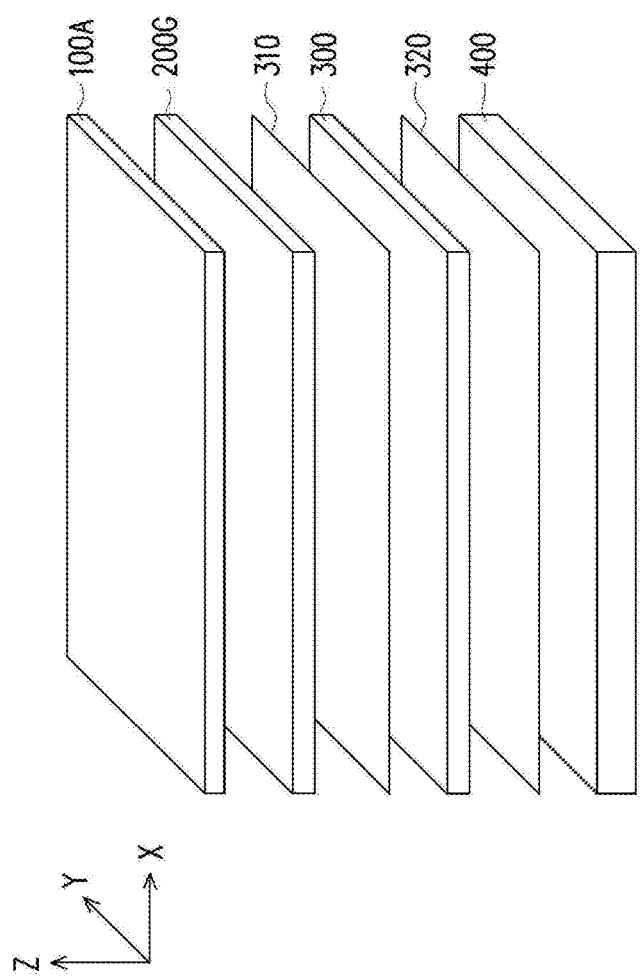
FIG. 23 is a schematic diagram of a display device according to a ninth embodiment of the invention.
Figure 25:
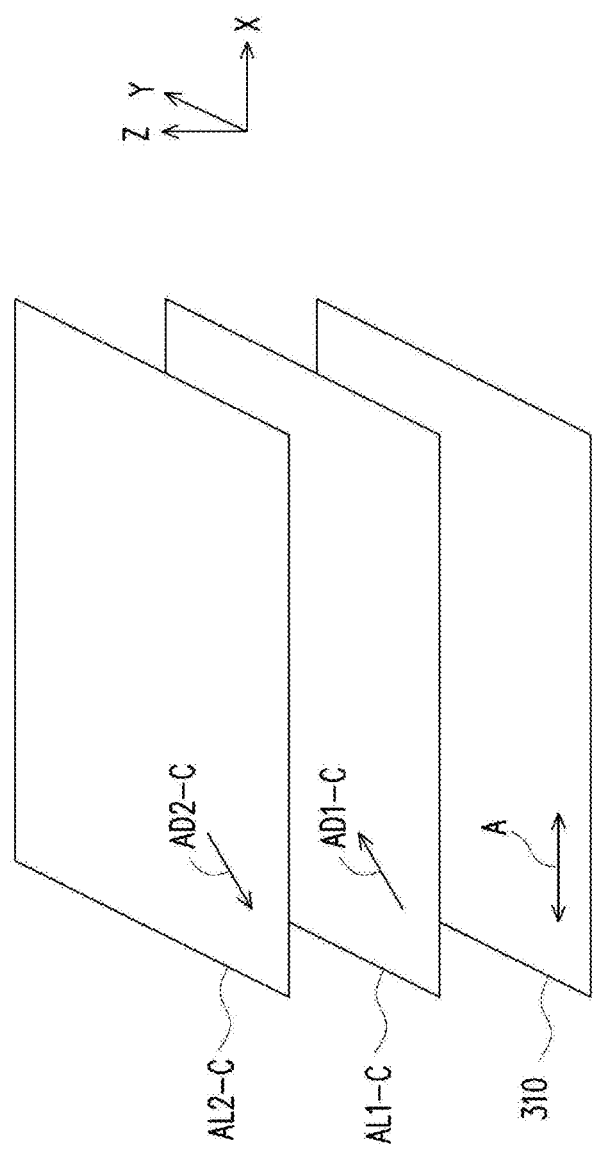
FIG. 25 is a schematic diagram of a part of the film layer of the display device of FIG. 23.
Figures 26A, 26B:
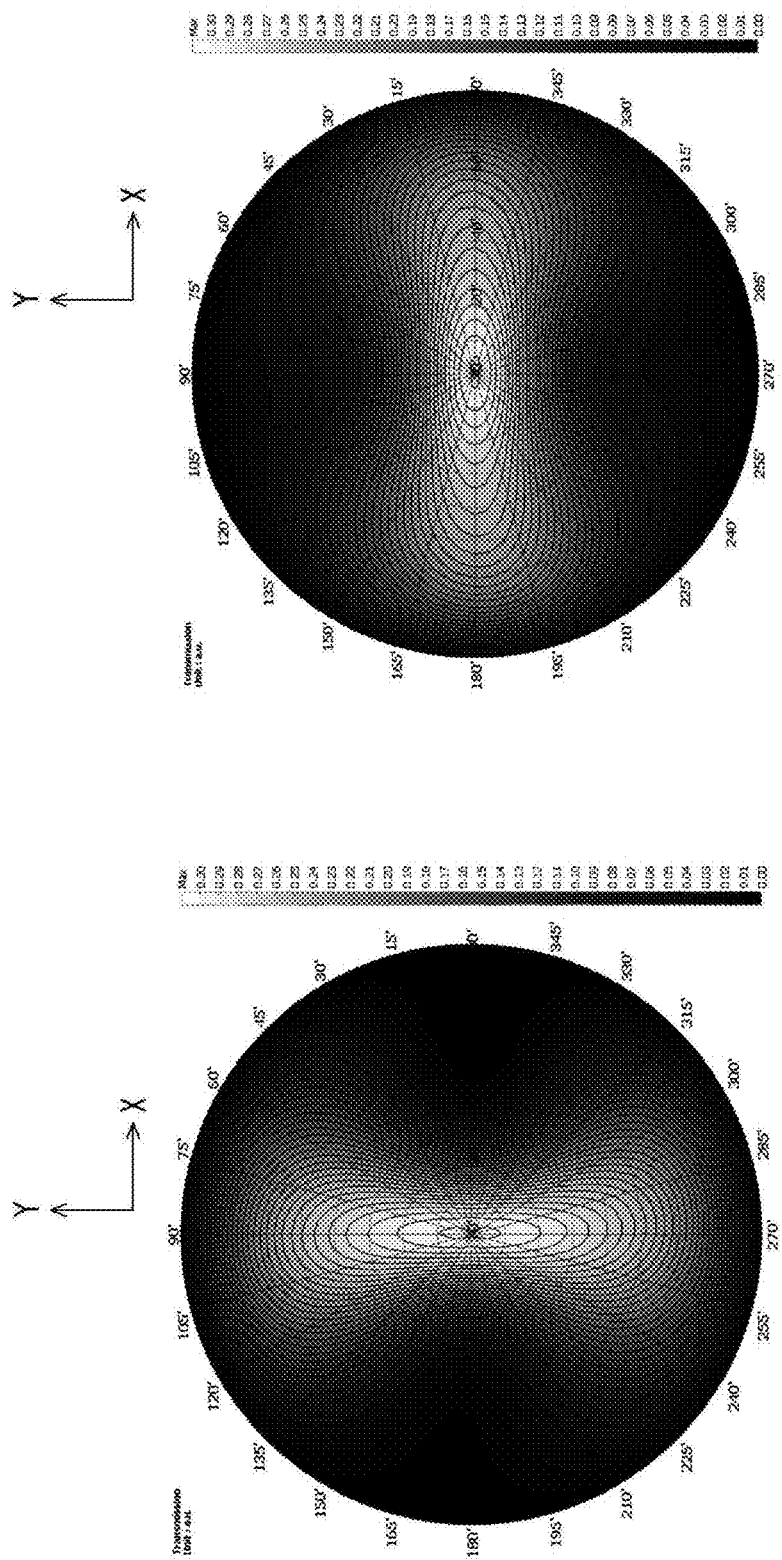
FIG. 26A and FIG. 26B are transmittance distribution diagrams of the display device of FIG. 23 operated in different anti-peep modes.
Figure 27:
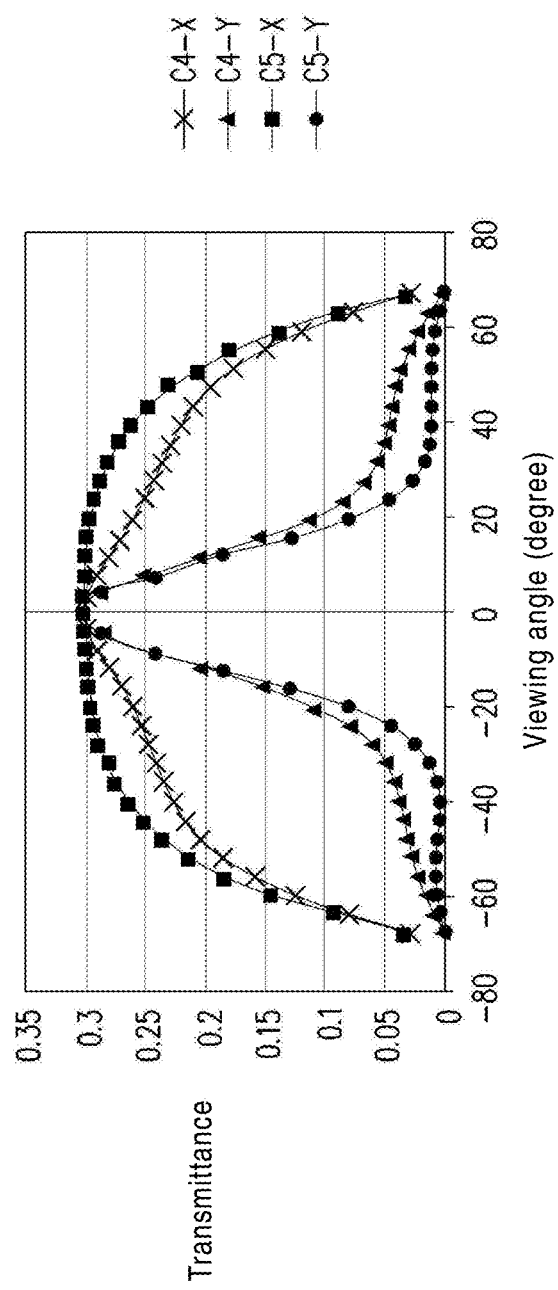
FIG. 27 is a diagram illustrating viewing angle-transmittance curves of the display device of FIG. 23 and the display device of FIG. 15 in different directions.

FIG. 23 is a schematic diagram of a display device according to a ninth embodiment of the invention. FIG. 24A to FIG. 24D are respectively schematic cross-sectional views of the display device of FIG. 23 in different planes when operating in different anti-peep modes. In particular, for clarity's sake, FIG. 24A to FIG. 24D omit illustration of the polarizer 310 and the backlight module 400 of FIG. 23. FIG. 25 is a schematic diagram of a part of the film layer of the display device of FIG. 23. FIG. 26A and FIG. 26B are transmittance distribution diagrams of the display device of FIG. 23 operated in different anti-peep modes. FIG. 27 is a diagram illustrating viewing angle-transmittance curves of the display device of FIG. 23 and the display device of FIG. 15 in different directions.

Referring to FIG. 23, FIG. 24A to FIG. 24D and FIG. 25, a difference between a display device 20 of the embodiment and the display device 10 of FIG. 1 lies in a different arrangement sequence of component members, a different composition of the viewing angle limiting device, and a different operation mode of the liquid crystal layer of the electronic viewing angle switch. In the embodiment, an electrically controlled viewing angle switch 200G and a display panel 300 of the display device 20 are arranged between the backlight module 400 and a viewing angle limiting device 100A, and the electrically controlled viewing angle switch 200G is located between the viewing angle limiting device 100A and the polarizer 310, and the backlight module 400, the polarizer 320, the display panel 300, and the polarizer 310 are sequentially stacked. The electronically controlled viewing angle switch 200G of the embodiment is similar to the electronically controlled viewing angle switch 200C of FIG. 14, i.e., the liquid crystal molecules LC of a liquid crystal layer LCL-G of the electronically controlled viewing angle switch 200G are arranged substantially in a same direction, and a configuration relationship between the alignment directions of the two alignment films of the electronically controlled viewing angle switch 200G and the absorption axis A of the polarizer 310 is shown in FIG. 25, which is also similar to the configuration relationship of FIG. 15. Therefore, please refer to the relevant paragraphs of the aforementioned fifth embodiment for detailed description, and detail thereof is not repeated.

In the embodiment, in order to make the viewing angle limiting device 100A to be directly attached to the second substrate 202 of the electronically controlled viewing angle switch 200G, the viewing angle limiting device 100A may not have the protective layer 101 of FIG. 2A. To be specific, regarding the polarized light beam from the display panel 300, the light component with the electric field polarization direction parallel to the absorption axis A of the polarizer 310 may be absorbed, so that the polarized light beam forms a light beam having the first linear polarization P1 after passing through the polarizer 310. It should be noted that in the embodiment, the polarization state of the light beam from the display panel 300 being in the first linear polarization P1 is taken as an example for description, but the invention is not limited thereto. In other embodiments, the polarization state of the light beam from the display panel 300 may also be in elliptical polarization or circular polarization. The two anti-peep modes of the display device 20 will be exemplarily described below.

Figure 24A:
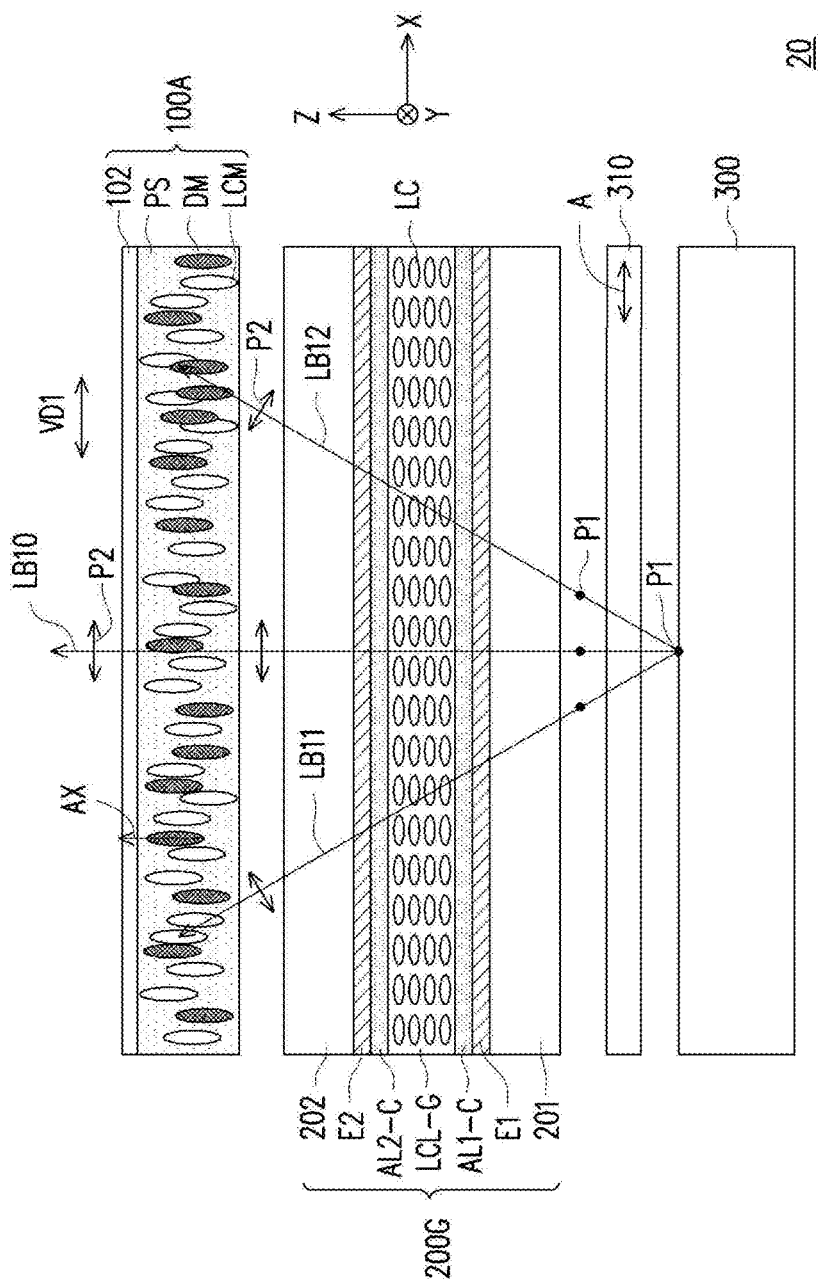
FIG. 24A to FIG. 24D are respectively schematic cross-sectional views of the display device of FIG. 23 in different planes when operating in different anti-peep modes.
Figure 24B:
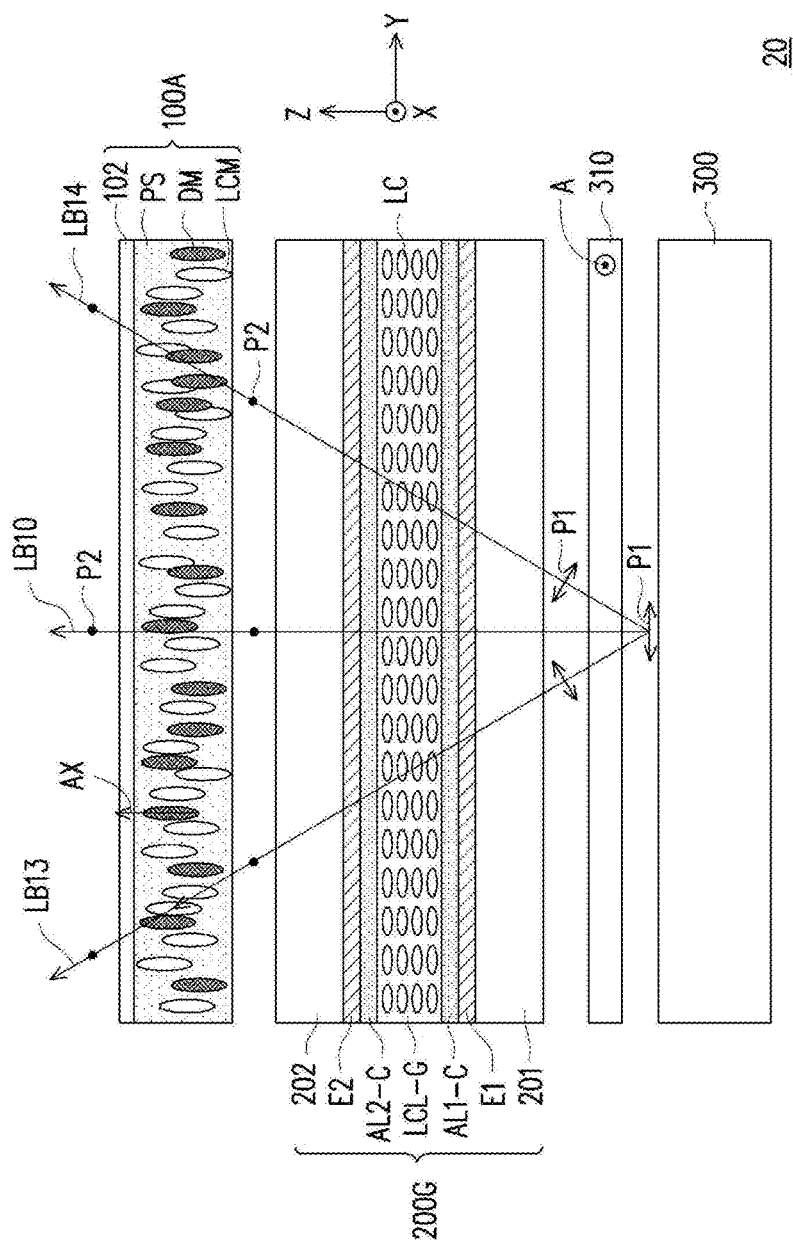

First, referring to FIG. 24A and FIG. 24B, when the display device 20 is operated in the first anti-peep mode, no voltage is applied between the first electrode E1 and the second electrode E2 of the electronically controlled viewing angle switch 200G, and the liquid crystal molecules LC of the liquid crystal layer LCL-G are substantially arranged in parallel to the alignment direction of the two alignment films AL1-C. Therefore, after the light beam from the polarizer 310 passes through the electronically controlled viewing angle switch 200G, the polarization direction of the polarization state may be changed due to the arrangement of the liquid crystal molecules LC.

For example, after a light beam LB10, a light beam LB11, a light beam LB12, a light beam LB13, and a light beam LB14 from the polarizer 310 pass through the electronically controlled viewing angle switch 200G, their respective polarization states may be changed from the first linear polarization P1 to the second linear polarization P2. Then, after the light beams enter the viewing angle limiting device 100A, the light components with the electric field polarization directions not perpendicular to the axial direction of the absorption axes AX of the dye molecules DM are absorbed by the dye molecules DM. To be specific, as shown in FIG. 24A, the light beam LB10 from the electronically controlled viewing angle switch 200G still maintains the original second linear polarization P2 after passing through the viewing angle limiting device 100A, while the light beam LB11 (or the light beam LB12) from the electronically controlled viewing angle switch 200G is absorbed due to that it has the light component with the electric field polarization direction parallel to the axial direction of the absorption axes AX of the dye molecules DM, and a degree of absorption increases as an incident angle of the light beam increases. In other words, the viewing angle limiting device 100A at this time has a large viewing angle filtering effect on the XZ plane, so that the display device 20 has the anti-peep effect on the XZ plane.

On the contrary, as shown in FIG. 24B, since the electric field polarization direction of the second linear polarization P2 of the light beam LB13 and the light beam LB14 from the electronically controlled viewing angle switch 200G is perpendicular to the axial direction of the absorption axes AX of the dye molecules DM, the light beam LB13 and the light beam LB14 may all directly pass through the viewing angle limiting device 100A. In other words, the viewing angle limiting device 100A at this time does not have the large viewing angle filtering effect on the YZ plane, so that the display device 20 does not have the anti-peep effect on the YZ plane. As shown in FIG. 26A, the first viewing angle control direction VD1 of the display device 20 at this time is parallel to the direction X.

Figure 24C:
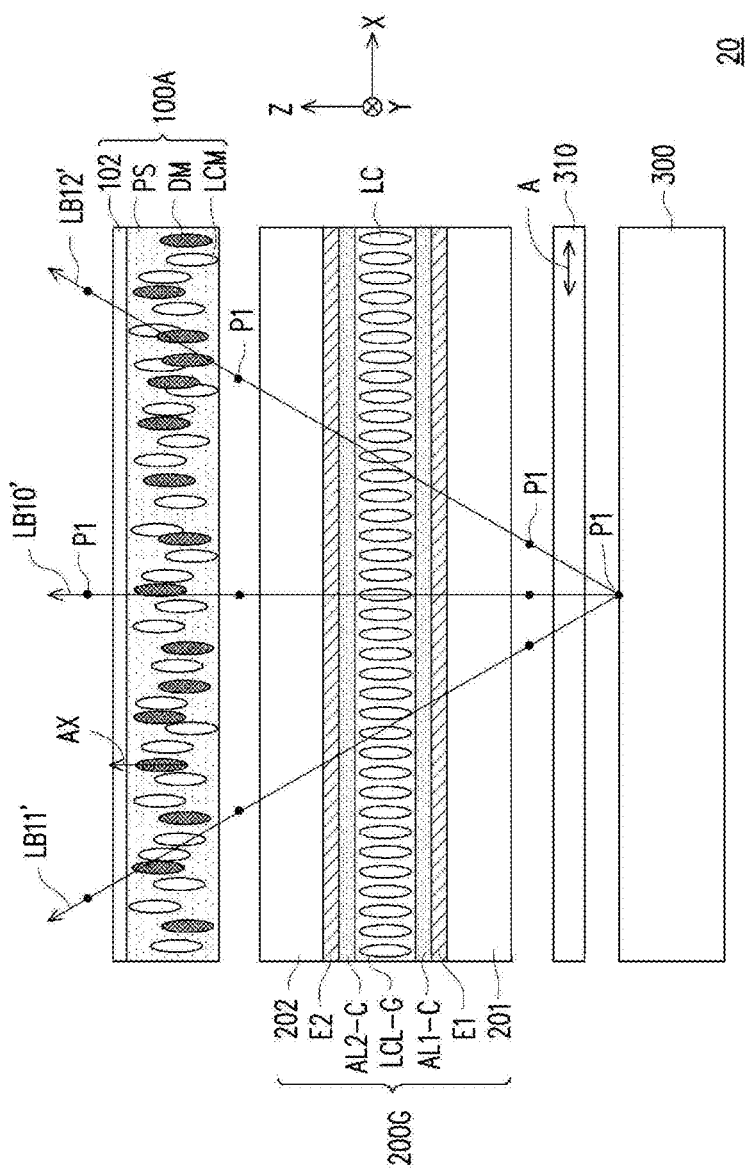
Figure 24D:
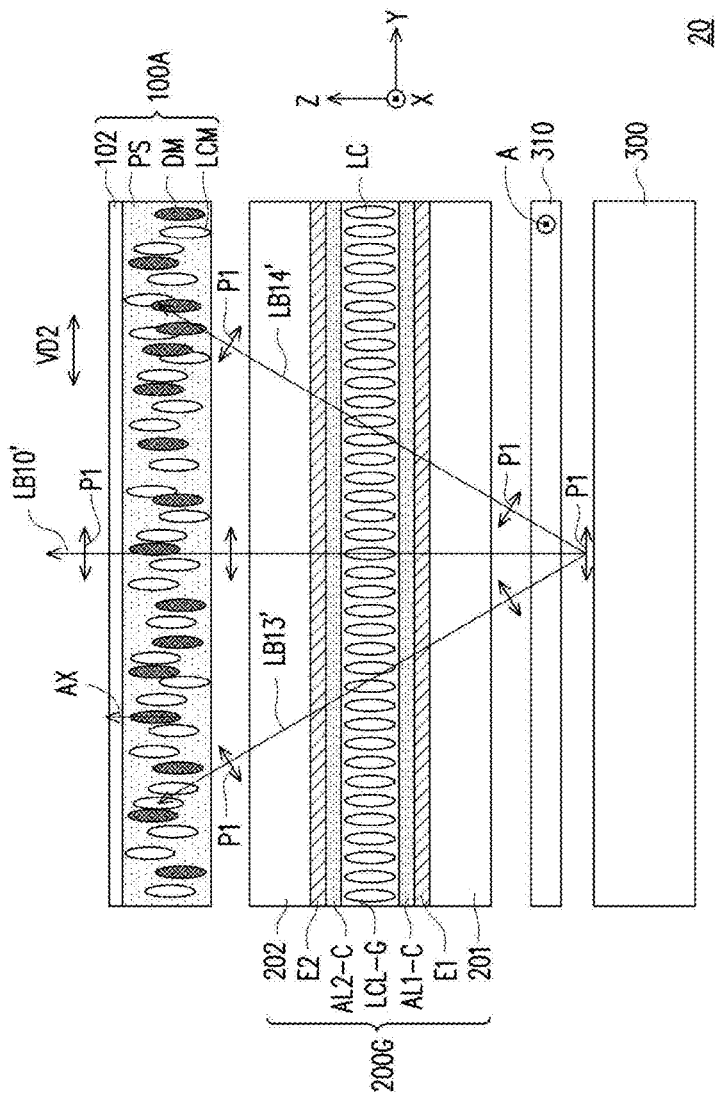

When the display device 20 is operated in the second anti-peep mode, as shown in FIG. 24C and FIG. 24D, a voltage is applied between the first electrode E1 and the second electrode E2 of the electronically controlled viewing angle switch 200G. Under a function of an electric field, an axial direction of the optical axes of the liquid crystal molecules LC of the liquid crystal layer LCL-G is substantially perpendicular to film surfaces of the alignment film AL1-C and the alignment film AL2-C. Therefore, after the light beam from the polarizer 310 passes through the electronically controlled viewing angle switch 200G, the polarization direction of the polarization state is substantially not changed due to the arrangement of the liquid crystal molecules LC.

For example, since the electric field polarization direction of the first linear polarization Pb of a light beam LB10', a light beam LB11' and a light beam LB12' from the electronically controlled viewing angle switch 200G is perpendicular to the axial direction of the absorption axes AX of the dye molecules DM, the light beam LB10', the light beam LB11' and the light beam LB12' may all directly pass through the viewing angle limiting device 100A. In other words, the viewing angle limiting device 100A at this time does not have the large viewing angle filtering effect on the XZ plane, so that the display device 20 does not have the anti-peep effect on the XZ plane.

On the contrary, a light beam LB13' (or a light beam LB14') from the electronically controlled viewing angle switch 200G is absorbed due to that it has the light component with the electric field polarization direction parallel to the axial direction of the absorption axes AX of the dye molecules DM, and a degree of absorption increases as an incident angle of the light beam increases. In other words, the viewing angle limiting device 100A at this time has the large viewing angle filtering effect on the YZ plane, so that the display device 20 has the anti-peep effect on the YZ plane. As shown in FIG. 26B, the second viewing angle control direction VD2 of the display device 20 at this time is parallel to the direction Y.

It should be noted that in the embodiment, the maximum phase retardation of the liquid crystal layer LCL-G of the electronically controlled viewing angle switch 200G is greater than a quarter wavelength and less than a half wavelength. Compared to the aforementioned fifth embodiment where the maximum phase retardation of the liquid crystal layer LCL-C of the electronically controlled viewing angle switch 200C is the half wavelength, transmittances (a curve C4-X in FIG. 27) of the electronically controlled viewing angle switch 200G of the embodiment corresponding to different viewing angles in the direction X are all slightly less than transmittances (a curve C5-X in FIG. 27) of the electronically controlled viewing angle switch 200C corresponding to different viewing angles in the direction X. On the contrary, transmittances (a curve C4-Y in FIG. 27) of the electronically controlled viewing angle switch 200G of the embodiment corresponding to different viewing angles in the direction Y are all slightly greater than transmittances (a curve C5-Y in FIG. 27) of the electronically controlled viewing angle switch 200C corresponding to different viewing angles in the direction Y. In this way, the display device 20 may satisfy different applications and requirements of anti-peep display.

Figure 28:
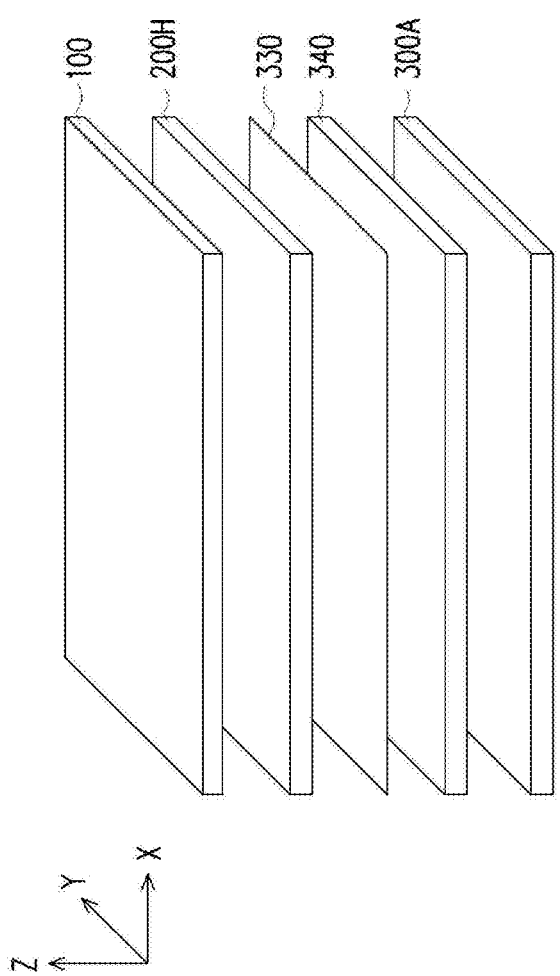
FIG. 28 is a schematic diagram of a display device according to a tenth embodiment of the invention.
Figure 29:
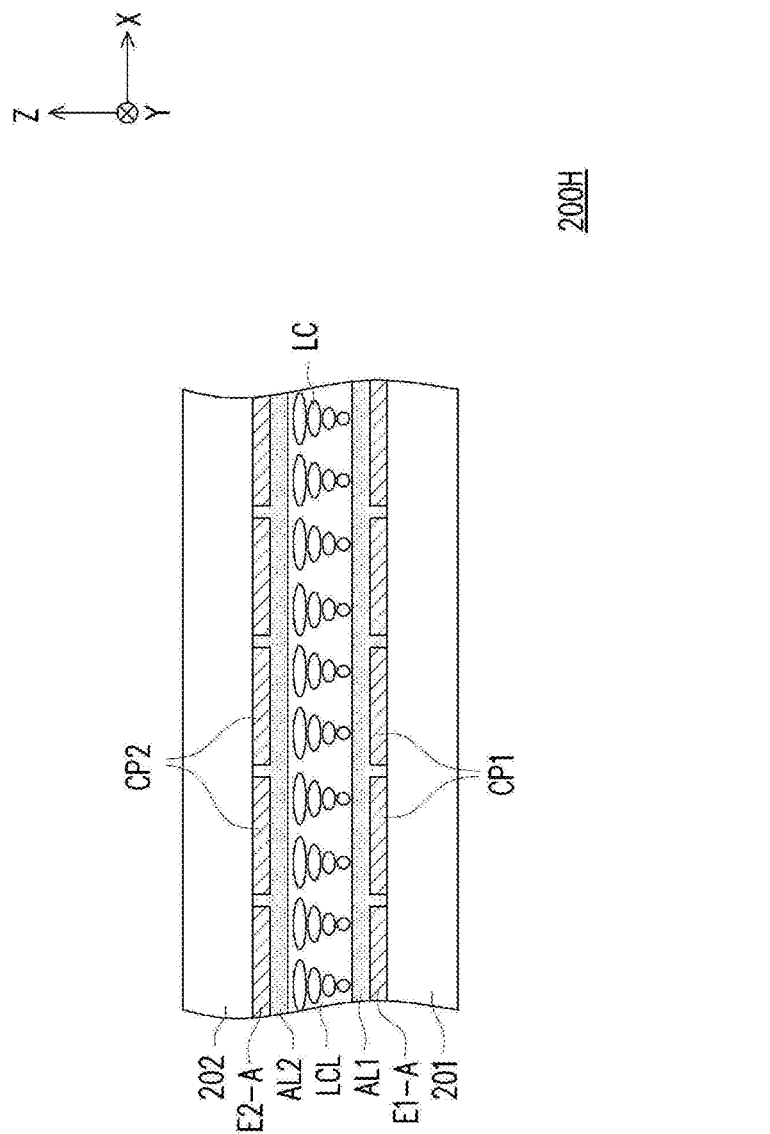
FIG. 29 is a schematic cross-sectional view of an electronically controlled viewing angle switch of FIG. 28.
Figure 30:
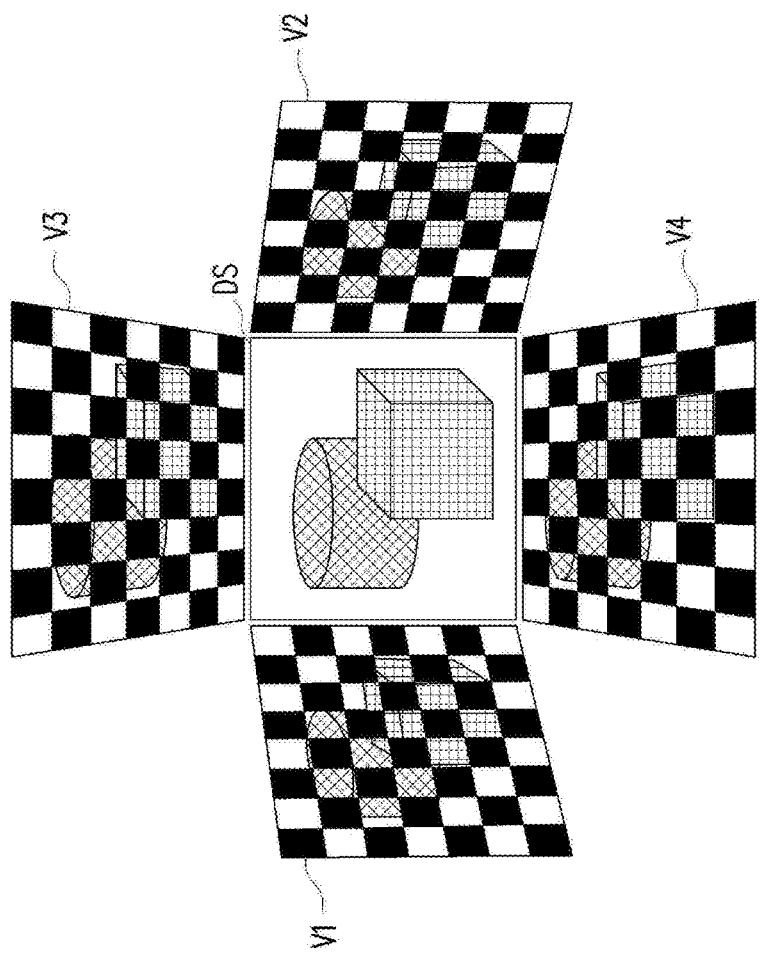
FIG. 30 is an anti-peep schematic diagram of the display device of FIG. 28 under side viewing angles of different orientations.

FIG. 28 is a schematic diagram of a display device according to a tenth embodiment of the invention. FIG. 29 is a schematic cross-sectional view of an electronically controlled viewing angle switch of FIG. 28. FIG. 30 is an anti-peep schematic diagram of the display device of FIG. 28 under side viewing angles of different orientations. Referring to FIG. 28 to FIG. 30, a difference between a display device 30 of the embodiment and the display device 20 of FIG. 23 lies in a different composition of the display device. In the embodiment, a display panel 300A of the display device 30 is, for example, an organic light emitting diode (OLED) panel, a micro light emitting diode (micro LED) panel, or other suitable self-luminous display panels, and there is no need to additionally configure the backlight module 400 of FIG. 23.

On the other hand, the display device 30 may also selectively include a quarter-wave plate 340, which is disposed between the display panel 300A and a polarizer 330, where the polarizer 330 is located between an electronically controlled viewing angle switch 200H and the quarter-wave plate 340, and the electronically controlled viewing angle switch 200H is disposed between the viewing angle limiting device 100 and the polarizer 330. Since a configuration relationship between the alignment direction of the two alignment films of the electronically controlled viewing angle switch 200H of the embodiment and the axial direction of the absorption axis of the polarizer 330 is similar to the configuration relationship of the electronically controlled viewing angle switch 200 and the polarizer 310 of the aforementioned first embodiment, detailed description thereof may be obtained by referring to the relevant paragraphs of the aforementioned embodiment, which will not be repeated, but the invention is not limited thereto. In other embodiments, the display device does not include the electronically controlled viewing angle switch 200H and the polarizer 330, and the quarter-wave plate 340 may be disposed between the viewing angle limiting device 100 and the display panel 300A. At this time, the display device 30 may reduce ambient light reflection of oblique angles. Since the display panel 300A is a self-luminous display panel, image contrast thereof may be effectively improved when the ambient light reflection is reduced, and since the display panel 300A of the embodiment is not provided with a circular polarizer, a brightness of the display panel 300A may be further improved. Further, in order to further improve vertical viewing angle contrast, an optical film or an optical structure may also be added to the surface of the viewing angle limiting device 100 to deflect the ambient incident light of the forward direction to a large angle. Based on such arrangement, a front brightness of the display device 30 may be higher than that of the circular polarizer, and the contrast may also be at a certain level.

In particular, in the embodiment, as shown in FIG. 29, the first electrode E1-A of the electrically controlled viewing angle switch 200H is composed of a plurality of conductive patterns CP1 that are electrically independent from each other, and the second electrode E2-A is composed of a plurality of conductive patterns CP2 that are electrically independent from each other, and the conductive patterns CP1 are respectively overlapped with the conductive patterns CP2 to form a plurality of conductive pattern groups. More specifically, the liquid crystal layer LCL of the embodiment may use these conductive pattern groups to realize zoning control of anti-peep display.

For example, when the display device 30 is operated in the anti-peep mode, one of any two adjacent conductive pattern groups in the electronically controlled viewing angle switch 200H is not applied with voltage, and the other one is applied with voltage. Therefore, when the user views the display device 30 from a side viewing angle in the horizontal direction, a display screen DS thereof may present a plurality of black blocks in regions of the electronically controlled viewing angle switch 200H where no voltage is applied, and present a plurality of image blocks in regions of the electronically controlled viewing angle switch 200H where voltage is applied. The black blocks and the image blocks are, for example, overlaid on the display screen DS in a checkerboard manner, and form broken images, shown as a left-side viewing angle image V1 and a right-side viewing angle image V2 in FIG. 30.

On the other hand, when the user views the display device 30 from a side viewing angle in the vertical direction, the display screen DS thereof may present a plurality of image blocks in regions of the electronically controlled viewing angle switch 200H where no voltage is applied, and present a plurality of black blocks in regions of the electronically controlled viewing angle switch 200H where voltage is applied. The black blocks and the image blocks are also, for example, overlaid on the display screen DS in the checkerboard manner, and form broken images, shown as an upper-side viewing angle image V3 and a lower-side viewing angle image V4 in FIG. 30. In other words, the display device 30 of the embodiment may simultaneously have the side viewing angle anti-peep effect in two dimensions (i.e., the horizontal direction and the vertical direction).

Figure 31:
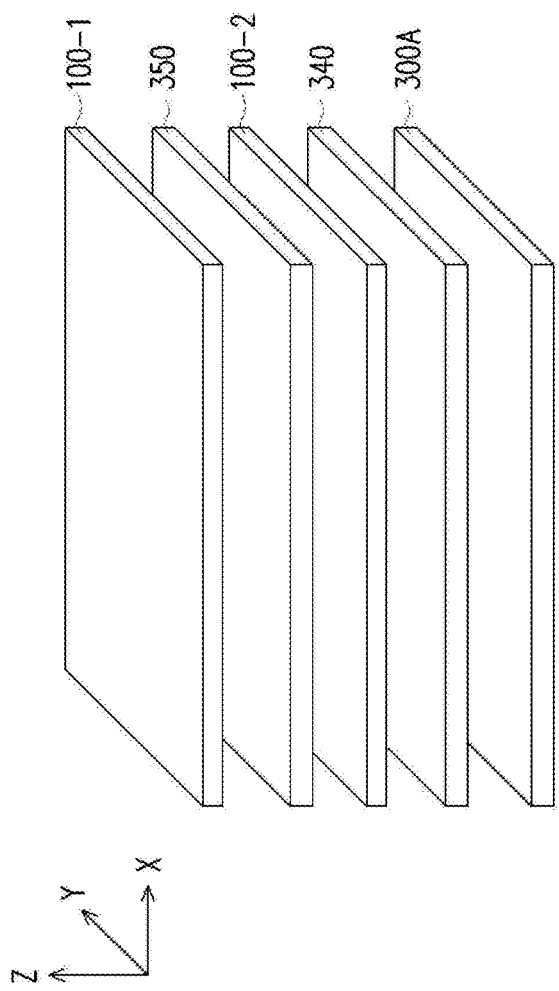
FIG. 31 is a schematic diagram of a display device according to an eleventh embodiment of the invention.
Figure 32A:
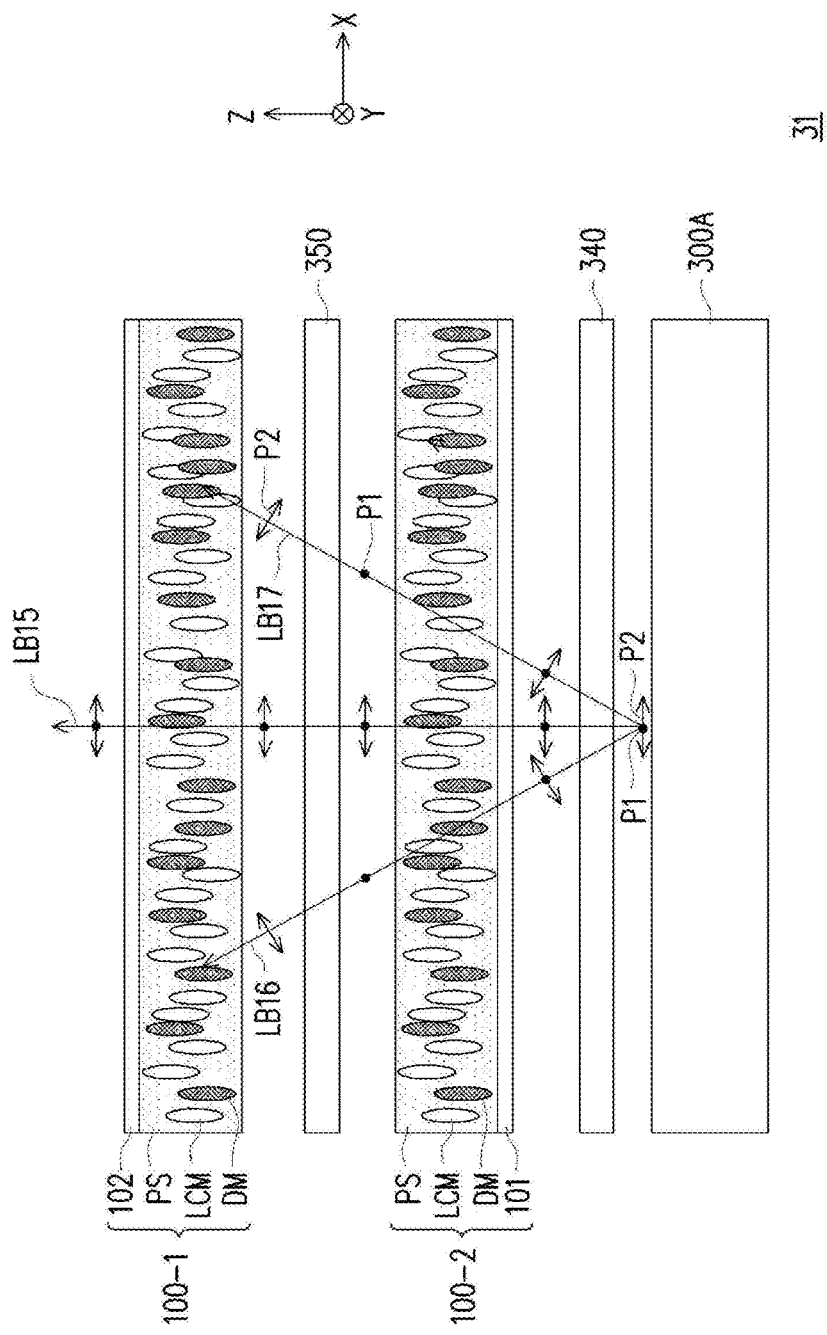
FIG. 32A and FIG. 32B are schematic cross-sectional views of the display device of FIG. 31 in different planes when operating in an anti-peep mode.
Figure 32B:
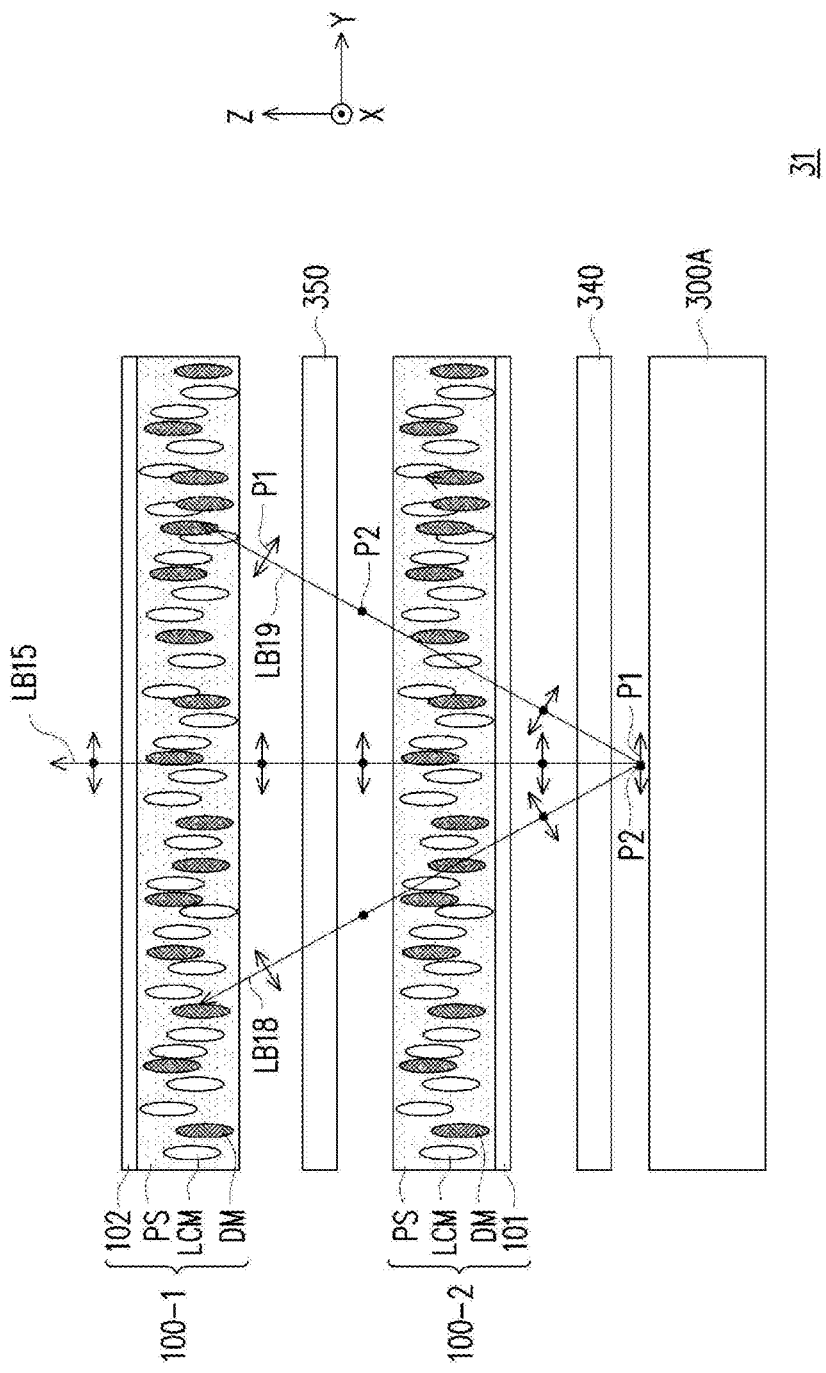

FIG. 31 is a schematic diagram of a display device according to an eleventh embodiment of the invention. FIG. 32A and FIG. 32B are schematic cross-sectional views of the display device of FIG. 31 in different planes when operating in an anti-peep mode. Referring to FIG. 31, a difference between a display device 31 of the embodiment and the display device 30 of FIG. 28 lies in a different composition of the display device. In the embodiment, the display device 31 does not have the electrically controlled viewing angle switch 200H and the polarizer 330 of FIG. 28. More specifically, the display device 31 has only a single operation mode, i.e., a full viewing angle anti-peep mode.

It should be noted that the number of viewing angle limiting devices of the display device 31 is two, i.e., a first viewing angle limiting device 100-1 and a second viewing angle limiting device 100-2, and a compensation film 350 is further provided between the two viewing angle limiting devices. To be specific, the display panel 300A, the quarter-wave plate 340, the viewing angle limiting device 100-2, the compensation film 350, and the viewing angle limiting device 100-1 are sequentially stacked. In the embodiment, an in-plane phase retardation of the compensation film 350 is a half wavelength or an odd multiple of the half wavelength, and an in-plane retardation of the quarter-wave plate 340 is an odd multiple of a quarter wavelength, but the invention is not limited thereto. Since the first viewing angle limiting device 100-1 and the second viewing angle limiting device 100-2 are similar to the viewing angle limiting device 100 of the aforementioned embodiment, detailed description thereof may refer to the relevant paragraphs of the aforementioned embodiment, which is not repeated.

The anti-peep operation of the display device 31 is exemplarily described below. Referring to FIG. 32A and FIG. 32B, after a light beam LB15 from the quarter-wave plate 340 sequentially passes through the second viewing angle limiting device 100-2, the compensation film 350, and the first viewing angle limiting device 100-1, the light beam LB15 still has the non-polarized state, and is emitted out of the display device 31. A light beam LB16 (or a light beam LB17) from the quarter-wave plate 340 has the first linear polarization P1 after passing through the second viewing angle limiting device 100-2, and after the light beam LB16 (or the light beam LB17) passes through the compensation film 350, the first linear polarization P1 thereof is changed into the second linear polarization P2. Since the electric field polarization direction of the second linear polarization P2 is coplanar with the axial direction of the absorption axis AX of the dye molecules DM of the first viewing angle limiting device 100-1, the light beam LB16 (or the light beam LB17) with the second linear polarization P2 may be absorbed by the dye molecules DM.

On the other hand, since a light path length of the light beam with a different incident angle in the viewing angle limiting device 100-1 is different, a degree of absorption of the light component of the second linear polarization P2 is also different, for example: the larger the incident angle of the light beam is, the more the light component of the second linear polarization P2 is absorbed by the dye molecules DM. Therefore, the viewing angle limiting device 100-1 may have a large viewing angle filtering effect. In other words, the display device 31 at this time has the first viewing angle control direction parallel to the direction X on the XZ plane.

Further, as shown in FIG. 32B, a light beam LB18 (or a light beam LB19) from the quarter-wave plate 340 has the second linear polarization P2 after passing through the second viewing angle limiting device 100-2, and after the light beam LB18 (or the light beam LB19) passes through the compensation film 350, the second linear polarization P2 thereof is changed into the first linear polarization P1. Since the electric field polarization direction of the first linear polarization P1 is coplanar with the axial direction of the absorption axes AX of the dye molecules DM of the first viewing angle limiting device 100-1, the light beam LB18 (or the light beam LB19) with the first linear polarization P1 may be absorbed by the dye molecules DM. In other words, the display device 31 at this time has the second viewing angle control direction parallel to the direction Y on the YZ plane.

It should be noted that through the configuration of the two viewing angle limiting devices and the compensation film 350, the display device 31 of the embodiment has the large viewing angle filtering effect in both of the direction X and the direction Y including the direction Z, and may absorb the ambient light obliquely incident to the display device 31 to improve the contrast, and the display device 31 is not provided with a circular polarizer, so that the brightness thereof may be higher than that of a known display device using the circular polarizer.

Figure 33:
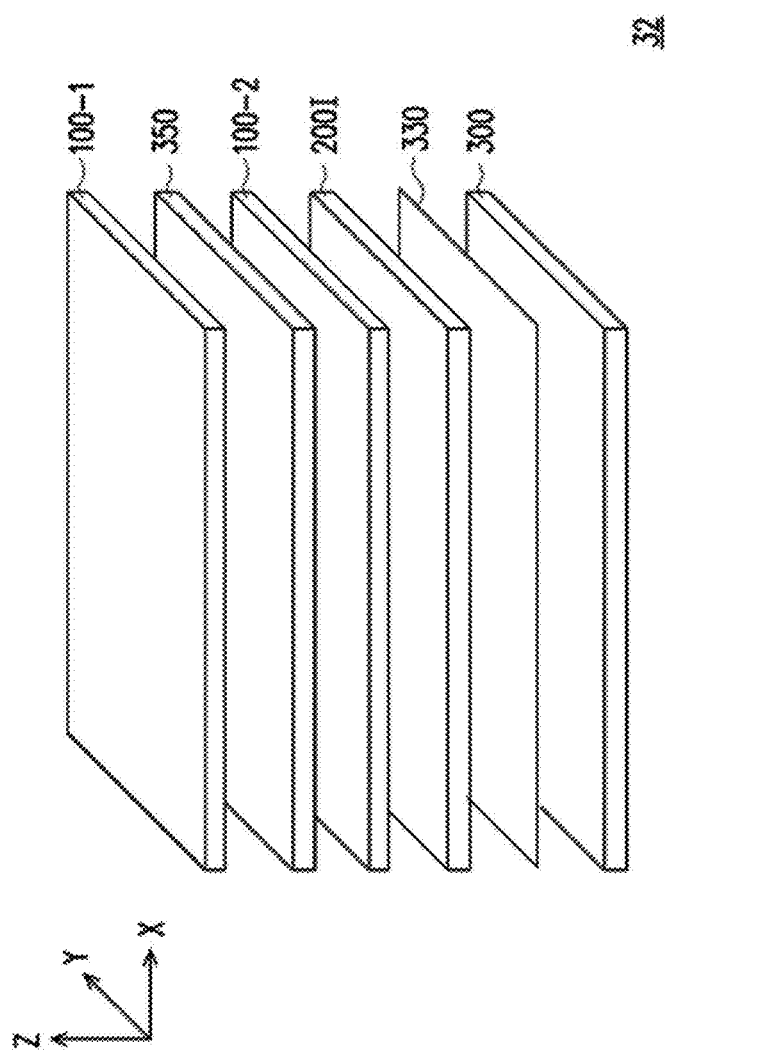
FIG. 33 is a schematic diagram of a display device according to a twelfth embodiment of the invention.

FIG. 33 is a schematic diagram of a display device according to a twelfth embodiment of the invention. Referring to FIG. 33, a difference between a display device 32 of the embodiment and the display device 10 of FIG. 1 lies in a different number of the viewing angle limiting devices and a different composition of the display device. The polarizer 330 of the embodiment is disposed between the display panel 300 and an electronically controlled viewing angle switch 200I, and one side of the electronically controlled viewing angle switch 200I away from the polarizer 330 is provided with the first viewing angle limiting device 100-1, the second viewing angle limiting device 100-2 and the compensation film 350, and the compensation film 350 is disposed between the first viewing angle limiting device 100-1 and the second viewing angle limiting device 100-2, where the compensation film 350 has a wave plate with an in-plane phase retardation of a half wavelength or an odd multiple of the half wavelength, and an optical axis thereof is parallel or perpendicular to the absorption axis of the polarizer 330. A backlight source (not shown) is provided on one side the display panel 300 away from the polarizer 330. In this case, compared with the embodiment of FIG. 1, an anti-peep range of the embodiment is effectively expanded.

In summary, in the viewing angle limiting device and the display device of an embodiment of the invention, by configuring the first absorption coefficient of the dye molecules in the thickness direction of the polymer substrate to be significantly greater than the second absorption coefficient of the dye molecules in the direction perpendicular to the thickness direction, a filtering effect of the viewing angle limiting device in a side viewing angle and a light transmittance of the viewing angle limiting device in a viewing angle direction may be effectively increased, so as to improve the anti-peep performance of the display device and an overall brightness of light beams of other viewing angles after exiting the display device. On the other hand, in the manufacturing method of the viewing angle limiting device according to an embodiment of the invention, in order to make the absorption coefficient of the dye molecules in the direction parallel to the predetermined direction to be significantly different from the absorption coefficient of the dye molecules in the direction perpendicular to the predetermined direction, a plurality of liquid crystal molecules arranged in the predetermined direction are used to drive the dye molecules to form an ordered arrangement and distribution, which increases optical design flexibility of the viewing angle limiting device and a manufacturing process margin.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and the best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A viewing angle limiting device, comprising a polymer substrate, at least one another polymer substrate, a compensation film and a plurality of dye molecules, wherein
the dye molecules are dispersedly arranged in the polymer substrate and the at least one another polymer substrate, the compensation film is located between the polymer substrate and the at least one another polymer substrate, the dye molecules have a first absorption coefficient in a thickness direction of the polymer substrate, the dye molecules have a second absorption coefficient in a direction perpendicular to the thickness direction, and a ratio of the first absorption coefficient to the second absorption coefficient is between 10 and 1000.

2. The viewing angle limiting device as claimed in claim 1, wherein an axial direction of absorption axes of the dye molecules is parallel to the thickness direction of the polymer substrate.

3. The viewing angle limiting device as claimed in claim 1, further comprising:
at least one protective film, disposed on at least one side of the polymer substrate.

4. The viewing angle limiting device of claim 1, wherein an in-plane phase retardation of the compensation film is a half wavelength or an odd multiple of a half wavelength.

5. A manufacturing method of a viewing angle limiting device, comprising:
forming a liquid crystal mixed material layer on a temporary substrate, the liquid crystal mixed material layer comprising a plurality of liquid crystal molecules, a plurality of dye molecules, and a plurality of reactive monomers, and the dye molecules being arranged corresponding to an optical axis of the liquid crystal molecules, wherein the dye molecules have a first absorption coefficient in a direction perpendicular to a surface of the temporary substrate, the dye molecules have a second absorption coefficient in a direction parallel to the surface of the temporary substrate, and a ratio of the first absorption coefficient to the second absorption coefficient is between 10 and 1000; and
curing the liquid crystal mixed material layer to cause a polymerization reaction of the reactive monomers to form a polymer substrate and at least one another polymer substrate, wherein the liquid crystal molecules and the dye molecules are dispersedly arranged in the polymer substrate and the at least one another polymer substrate, and a compensation film is located between the polymer substrate and the at least one another polymer substrate.

6. The manufacturing method of the viewing angle limiting device as claimed in claim 5, wherein the step of curing the liquid crystal mixed material layer comprises:
performing an ultraviolet light irradiation procedure on the liquid crystal mixed material layer.

7. The manufacturing method of the viewing angle limiting device as claimed in claim 5, further comprising:
forming an alignment film on the temporary substrate, so that an axial direction of the optical axes of the liquid crystal molecules is perpendicular to the surface of the temporary substrate.

8. The manufacturing method of the viewing angle limiting device as claimed in claim 5, further comprising:
removing the temporary substrate from a substrate surface of the polymer substrate; and
forming a protective layer on the substrate surface of the polymer substrate.

9. A display device, comprising a polarizer, at least one viewing angle limiting device, an electronically controlled viewing angle switch, and a display panel, wherein
the at least one viewing angle limiting device is overlapped with the polarizer, and comprises a polymer substrate and a plurality of dye molecules, wherein
the dye molecules are dispersedly arranged in the polymer substrate, the dye molecules have a first absorption coefficient in a thickness direction of the polymer substrate, the dye molecules have a second absorption coefficient in a direction perpendicular to the thickness direction, and a ratio of the first absorption coefficient to the second absorption coefficient is between 10 and 1000;
the electronically controlled viewing angle switch is arranged between the polarizer and the at least one viewing angle limiting device; and
the display panel is overlapped with the at least one viewing angle limiting device.

10. The display device as claimed in claim 9, wherein the electronically controlled viewing angle switch comprises a liquid crystal layer, a first alignment film, and a second alignment film, wherein
the first alignment film is disposed between the liquid crystal layer and the polarizer, the first alignment film has a first alignment direction, and the first alignment direction is parallel or perpendicular to an axial direction of an absorption axis of the polarizer; and
the second alignment film is disposed between the liquid crystal layer and the at least one viewing angle limiting device, wherein the liquid crystal layer is sandwiched between the first alignment film and the second alignment film.

11. The display device as claimed in claim 10, wherein the second alignment film has a second alignment direction, and the second alignment direction is perpendicular to the first alignment direction.

12. The display device as claimed in claim 10, wherein the second alignment film has a second alignment direction, and the second alignment direction is parallel or anti-parallel to the first alignment direction.

13. The display device as claimed in claim 9, wherein the electronically controlled viewing angle switch comprises a liquid crystal layer, a first alignment film, and a second alignment film, wherein
the first alignment film is disposed between the liquid crystal layer and the polarizer, and an included angle between a first alignment direction of the first alignment film and an absorption axis of the polarizer is 45 degrees; and
the second alignment film is disposed between the liquid crystal layer and the at least one viewing angle limiting device, a second alignment direction of the second alignment film is anti-parallel to the first alignment direction of the first alignment film, and the liquid crystal layer is sandwiched between the first alignment film and the second alignment film.

14. The display device as claimed in claim 13, wherein a maximum phase retardation of the liquid crystal layer is a quarter wavelength or greater than or equal to 3 µm.

15. The display device as claimed in claim 13, wherein a maximum phase retardation of the liquid crystal layer is a half wavelength.

16. The display device as claimed in claim 13, wherein a maximum phase retardation of the liquid crystal layer is greater than a quarter wavelength and less than a half wavelength.

17. The display device as claimed in claim 9, further comprising:
a backlight module, overlapped with the display panel, the at least one viewing angle limiting device, and the electronically controlled viewing angle switch, wherein the at least one viewing angle limiting device and the electronically controlled viewing angle switch are located between the display panel and the backlight module.

18. The display device as claimed in claim 9, further comprising:
a backlight module, overlapped with the display panel, the at least one viewing angle limiting device, and the electronically controlled viewing angle switch, wherein the electronically controlled viewing angle switch and the display panel are located between the at least one viewing angle limiting device and the backlight module.

19. The display device as claimed in claim 9, wherein the display device further comprises a quarter-wave plate, disposed between the display panel and the polarizer, and the polarizer is located between the electronically controlled viewing angle switch and the quarter-wave plate.

20. The display device as claimed in claim 9, wherein the electronically controlled viewing angle switch is an electronically controlled diffusion film.

21. A display device, comprising a polarizer, at least one viewing angle limiting device, an electronically controlled viewing angle switch, a compensation film, and a display panel, wherein
the at least one viewing angle limiting device is overlapped with the polarizer, and comprises a polymer substrate and a plurality of dye molecules, wherein
the dye molecules are dispersedly arranged in the polymer substrate, the dye molecules have a first absorption coefficient in a thickness direction of the polymer substrate, the dye molecules have a second absorption coefficient in a direction perpendicular to the thickness direction, and a ratio of the first absorption coefficient to the second absorption coefficient is between 10 and 1000;
the electronically controlled viewing angle switch is arranged between the polarizer and the at least one viewing angle limiting device;
the display panel is overlapped with the at least one viewing angle limiting device;
the at least one viewing angle limiting device comprises a first viewing angle limiting device and a second viewing angle limiting device, and the compensation film is disposed between the first viewing angle limiting device and the second viewing angle limiting device.

22. The display device as claimed in claim 21, wherein an in-plane phase retardation of the compensation film is a half wavelength or an odd multiple of the half wavelength.

23. A display device, comprising a display panel, a quarter-wave plate, and at least one viewing angle limiting device, wherein
the quarter-wave plate is overlapped with the display panel; and
the at least one viewing angle limiting device is overlapped with the quarter-wave plate, and the viewing angle limiting device comprises a polymer substrate and a plurality of dye molecules, wherein
the dye molecules are dispersedly arranged in the polymer substrate, the dye molecules have a first absorption coefficient in a thickness direction of the polymer substrate, the dye molecules have a second absorption coefficient in a direction perpendicular to the thickness direction, and a ratio of the first absorption coefficient to the second absorption coefficient is between 10 and 1000.

24. The display device as claimed in claim 23, wherein an in-plane phase retardation of the quarter-wave plate is an odd multiple of a quarter wavelength.

25. A display device, comprising a display panel, a quarter-wave plate, a compensation film and at least one viewing angle limiting device, wherein
the quarter-wave plate is overlapped with the display panel;
the at least one viewing angle limiting device is overlapped with the quarter-wave plate, and the viewing angle limiting device comprises a polymer substrate and a plurality of dye molecules, wherein
the dye molecules are dispersedly arranged in the polymer substrate, the dye molecules have a first absorption coefficient in a thickness direction of the polymer substrate, the dye molecules have a second absorption coefficient in a direction perpendicular to the thickness direction, and a ratio of the first absorption coefficient to the second absorption coefficient is between 10 and 1000;
the at least one viewing angle limiting device comprises a first viewing angle limiting device and a second viewing angle limiting device, and the compensation film is disposed between the first viewing angle limiting device and the second viewing angle limiting device.

26. The display device as claimed in claim 25, wherein an in-plane phase retardation of the compensation film is a half wavelength or an odd multiple of the half wavelength.

* * * * *